(12) United States Patent
Ogikubo et al.

(10) Patent No.: US 7,400,438 B2
(45) Date of Patent: Jul. 15, 2008

(54) MICRO-ELECTRO MECHANICAL DEVICE, MICRO-ELECTRO MECHANICAL DEVICE ARRAY, LIGHT MODULATION DEVICE, MICRO-ELECTRO MECHANICAL LIGHT MODULATION DEVICE, MICRO-ELECTRO MECHANICAL LIGHT MODULATION DEVICE ARRAY AND IMAGE FORMING APPARATUS USING THE SAME

(75) Inventors: Shinya Ogikubo, Ashigarakami-gun (JP); Koichi Kimura, Ashigarakami-gun (JP); Fumihiko Mochizuki, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 11/709,028

(22) Filed: Feb. 22, 2007

(65) Prior Publication Data

US 2008/0074728 A1    Mar. 27, 2008

(30) Foreign Application Priority Data

Feb. 28, 2006    (JP) .............................. 2006-052495

(51) Int. Cl.
    *G02B 26/00*    (2006.01)
(52) U.S. Cl. .................. 359/295; 359/290; 359/291; 359/292; 359/298; 359/315; 359/224; 345/85; 345/108; 348/770; 348/771
(58) Field of Classification Search ................ 359/223, 359/224, 290–292, 295, 298, 315; 345/85, 345/108; 348/770, 771
See application file for complete search history.

(56) References Cited

U.S. PATENT DOCUMENTS

| 6,618,186 | B2 | 9/2003 | Kaeriyama |
| 2006/0279496 | A1* | 12/2006 | Ogikubo et al. ............... 345/85 |
| 2007/0002426 | A1* | 1/2007 | Ogikubo et al. ............. 359/291 |
| 2007/0007849 | A1* | 1/2007 | Ogikubo et al. ............. 359/291 |
| 2007/0024951 | A1* | 2/2007 | Mochizuki et al. .......... 359/291 |
| 2007/0024952 | A1* | 2/2007 | Ogikubo et al. ............. 359/291 |
| 2007/0121191 | A1* | 5/2007 | Pan ............................ 359/291 |
| 2007/0121192 | A1* | 5/2007 | Lee et al. ..................... 359/291 |
| 2007/0127110 | A1* | 6/2007 | Pan ............................ 359/298 |

FOREIGN PATENT DOCUMENTS

JP    2002-189178 A    7/2002

* cited by examiner

*Primary Examiner*—Evelyn A. Lester
(74) *Attorney, Agent, or Firm*—Sughrue Mion, PLLC

(57) ABSTRACT

A transition time is a time from a state where a movable portion has been rotationally displaced in the first direction and stopped to a state where driving portions apply the physical action forces to the movable portion to rotationally displace the movable portion in the second direction, which is different from the first direction, and the movable portion reaches a final displacement position. An elastic force value of the elastic supporting portion and the transition time have such a relationship that when the elastic force value of the elastic supporting portion is equal to a certain value, the transition time takes a local maximum value. The elastic force value of the elastic supporting portion is equal to or less than the certain value at which the transition time takes the local maximum value.

16 Claims, 21 Drawing Sheets

FIG. 13

| | | | CALC. EXA. 1 | CALC. EXA. 2 | CALC. EXA. 3 | CALC. EXA. 4 | CALC. EXA. 5 | CALC. EXA. 6 |
|---|---|---|---|---|---|---|---|---|
| MATERIAL OF MOVABLE PORTION | | | Al | Al | Al | Al | Al | Al |
| MATERIAL OF SUPPORTING PORTION | | | ACRYLIC RESIN | SILICONE | Al | ACRYLIC RESIN | SILICONE | Al |
| LENGTH OF MOVABLE PORTION | L1 | μm | 6.0 | 6.0 | 8.0 | 8.0 | 8.0 | 10.0 |
| WIDTH OF MOVABLE PORTION | L2 | μm | 6.0 | 6.0 | 8.0 | 8.0 | 8.0 | 10.0 |
| THICKNESS OF MOVABLE PORTION | H | μm | 0.5 | 0.5 | 0.5 | 0.5 | 0.5 | 0.5 |
| DENSITY OF MOVABLE PORTION | ρ | g/m³ | 2.7 | 2.7 | 2.7 | 2.7 | 2.7 | 2.7 |
| MASS OF MOVABLE PORTION | M | kg | 4.86 × 10⁻¹⁴ | 4.86 × 10⁻¹⁴ | 8.64 × 10⁻¹⁴ | 8.64 × 10⁻¹⁴ | 8.64 × 10⁻¹⁴ | 1.35 × 10⁻¹³ |
| TORSION STRENGTH OF SUPP. PORT. | k | | 1.62 × 10⁻²⁸ | 2.15 × 10⁻²⁴ | 1.43 × 10⁻²⁸ | 2.29 × 10⁻²⁸ | 2.93 × 10⁻²⁴ | 1.74 × 10⁻²⁹ |
| YOUNG'S MODULUS OF SUPP. PORT. | E | GPa (GN/m²) | 3.14 | 0.0003 | 68.85 | 3.14 | 0.0003 | 68.85 |
| POISSON'S RATIO OF SUPP. PORT. | ν | | 0.23 | 0.45 | 0.36 | 0.23 | 0.45 | 0.36 |
| LENGTH OF SUPPORTING PORTION | l1 | μm | 1.90 | 1.90 | 2.90 | 2.90 | 2.90 | 3.90 |
| WIDTH OF SUPPORTING PORTION | l2 | μm | 1.00 | 2.20 | 0.50 | 1.00 | 2.30 | 0.60 |
| THICKNESS OF SUPP. PORT. | h | μm | 0.08 | 1.80 | 0.045 | 0.090 | 2.00 | 0.045 |
| MODULUS OF LIGIDITY OF MATERIAL | G | GPa (GN/m²) | 1.28 | 0.000103 | 25.3 | 1.28 | 0.000103 | 25.3 |
| INERTIA MOMENT | J | kg·m² | 1.46 × 10⁻²⁵ | 1.46 × 10⁻²⁵ | 4.61 × 10⁻²⁵ | 4.61 × 10⁻²⁵ | 4.61 × 10⁻²⁵ | 1.13 × 10⁻²⁴ |
| COEFFICIENT OF VISCOUS DAMPING | a | kg·m²/s | 7.04 × 10⁻²⁰ | 7.04 × 10⁻²⁰ | 2.23 × 10⁻¹⁹ | 2.23 × 10⁻¹⁹ | 2.23 × 10⁻¹⁹ | 5.43 × 10⁻¹⁹ |
| SUPP.-PORT. ELASTIC FORCE | K | Nm | 2.18 × 10⁻¹³ | 2.35 × 10⁻¹³ | 2.50 × 10⁻¹³ | 2.02 × 10⁻¹³ | 2.09 × 10⁻¹³ | 2.25 × 10⁻¹³ |
| DAMPING RATIO | ξ | | 0.198 | 0.190 | 0.328 | 0.365 | 0.358 | 0.540 |
| PERMITTIVITY OF AMBIENT ATMOSPHERE | ε | F/m | 8.85 × 10⁻¹² | 8.85 × 10⁻¹² | 8.85 × 10⁻¹² | 8.85 × 10⁻¹² | 8.85 × 10⁻¹² | 8.85 × 10⁻¹² |
| DISTANCE BETWEEN ELECTRODES | d | μm | 5.21 × 10⁻⁷ | 5.21 × 10⁻⁷ | 6.95 × 10⁻⁷ | 6.95 × 10⁻⁷ | 6.95 × 10⁻⁷ | 8.68 × 10⁻⁷ |
| CONTACT ANGLE | e | deg. | ±10 | ±10 | ±10 | ±10 | ±10 | ±10 |

FIG. 14

| | | | COMP. EXA. 1 | COMP. EXA. 2 |
|---|---|---|---|---|
| MATERIAL OF SUPPORTING PORTION | | | Al | Al |
| LENGTH OF MOVABLE PORTION | L1 | μm | 7.64 | 8.91 |
| WIDTH OF MOVABLE PORTION | L2 | μm | 7.64 | 8.91 |
| THICKNESS OF MOVABLE PORTION | H | μm | 0.35 | 0.40 |
| DENSITY OF MOVABLE PORTION | ρ | g/m³ | 2.7 | 2.7 |
| MASS OF MOVABLE PORTION | M | kg | $1.10 \times 10^{-13}$ | $1.71 \times 10^{-13}$ |
| TORSION STRENGTH OF SUPP.PORT. | k | | $9.38 \times 10^{-29}$ | $9.38 \times 10^{-29}$ |
| YOUNG'S MODULUS OF SUPP.PORT. | E | GPa (GN/m²) | 68.85 | 68.85 |
| POISSON'S RATIO OF SUPP.PORT. | ν | | 0.36 | 0.36 |
| LENGTH OF SUPPORTING PORTION | l1 | μm | 4.50 | 4.50 |
| WIDTH OF SUPPORTING PORTION | l2 | μm | 0.60 | 0.60 |
| THICKNESS OF SUPP.PORT. | h | μm | 0.08 | 0.08 |
| MODULUS OF LIGIDITY OF MATERIAL | G | GPa (GN/m²) | 25.31 | 25.31 |
| INERTIAL MOMENT | J | kg·m² | $1.07 \times 10^{-24}$ | $2.27 \times 10^{-24}$ |
| COEFFICIENT OF VISCOUS DAMPING | a | kg·m²/s | $1.60 \times 10^{-19}$ | $2.32 \times 10^{-19}$ |
| SUPP.-PORT. ELASTIC FORCE | K | Nm | $1.06 \times 10^{-12}$ | $1.06 \times 10^{-12}$ |
| DAMPING RATIO | ξ | | 0.075 | 0.075 |
| PERMITTIVITY OF AMBIENT ATMOSPHERE | ε | F/m | $8.85 \times 10^{-12}$ | $8.85 \times 10^{-12}$ |
| DISTANCE BETWEEN ELECTRODES | d | μm | 1.70 | 2.50 |
| POTENTIAL DIFFERENCE | V | V | 10, 20, 30 | 10, 20, 30 |
| CONTACT ANGLE | θ | deg. | ±12 | ±12 |

MICRO-ELECTRO MECHANICAL DEVICE, MICRO-ELECTRO MECHANICAL DEVICE ARRAY, LIGHT MODULATION DEVICE, MICRO-ELECTRO MECHANICAL LIGHT MODULATION DEVICE, MICRO-ELECTRO MECHANICAL LIGHT MODULATION DEVICE ARRAY AND IMAGE FORMING APPARATUS USING THE SAME

BACKGROUND OF THE INVENTION

1. Field of the Invention

The invention relates to a micro-electro mechanical device, a micro-electro mechanical device array, a light modulation device, a micro-electro mechanical light modulation device, a micro-electro mechanical light modulation device array, and an image forming apparatus using the same.

2. Description of the Related Art

In recent years, micro-electro mechanical devices which electrically displace and move a micro-mechanical device in the order of μm have been developed briskly because of rapid advancements in MEMS (Micro-Electro Mechanical Systems) technology. Among micro-electro mechanical light modulation devices which have a light modulation function, there is, for example, a DMD (digital micro-mirror device; made by Texas Instruments Inc.) which can tilt a micro mirror to deflection light (see U.S. Pat. No. 6,618,186 and JP 2002-189178 A (which derive from family patent applications). This device exercises an electrostatic force on a movable portion, which is tilted to one side by an electrostatic force, in another direction to thereby rotationally displace the movable portion and modulate light in a mirror part of the movable portion. The DMD is used in wide applications, such as a projection display, a video monitor, a graphic monitor, a television and an electrophotographic printer, in the field of optical information processing. Further, application of optical switches to optical communication, optical interconnection (signal connection technology by means of light, such as an interconnection network in parallel computers), optical information processing (information processing by means of optical operation), etc. has been expected.

A transition time (time from a state where a movable portion is tilted to one side to a state where the movable portion is tilted to another side) or a response speed (speed when a movable portion in a state where the movable portion is tilted to one side is tilted to another side) of a movable portion of a rotational system device of the related art such as the DMD, is determined by the balance among (i) the inertia moment depending on the structure of the movable portion, (ii) the elastic force of a supporting portion, which supports the movable portion so that the movable portion is elastically deformable, and (iii) the magnitude of a voltage to be applied. Appropriate values are adopted at the time of design.

As for the relation between the transition time T and the supporting-portion elastic force K, as shown in FIG. 20, if the supporting-portion elastic force K becomes small, the transition time T of the device tends to increase because the elastic restoring force of the movable portion decreases. It is important to shorten the transition time in order to increase the responsiveness of the device. Therefore, in order to achieve a desired elastic restoring force, a design has generally been made to adopt the supporting-portion elastic force K, which is not excessively small, i.e., to increase the supporting-portion elastic force K.

However, if the supporting-portion elastic force K is increased in order to shorten the transition time T of the device, it is necessary to apply an electrode voltage against the supporting-portion elastic force K in order to drive the device. Thus, a driving voltage increases. Also, if the driving voltage increases, the electric power for the driving of the device will increase. Accordingly, it would be necessary to make a power supply device larger. For this reason, there is a trade-off relation between the followings. That is, in order to control the device in power-saving driving, the transition time becomes long, which leads to sacrifice of high-speed driving, and in order to control the device in high-speed driving, the supporting-portion elastic force K will increase, which leads to sacrifice of the power-saving driving.

Further, even if the supporting-portion elastic force K is increased, the amount of change in the transition time T is slight. Also, even if the supporting-portion elastic force K is increased to shorten the transition time T, a large amount of change in the transition time T cannot be expected in actuality.

SUMMARY OF THE INVENTION

The invention has been made in view of the above circumstances. The invention provides a micro-electro mechanical device, a micro-electro mechanical device array, a light modulation device, a micro-electro mechanical light modulation device, a micro-electro mechanical light modulation device array and an image forming apparatus using the same, which can speed up the transition operation of a movable portion when the movable portion performs bi-directional displacement, by setting the elastic force of an elastic supporting portion that supports the movable portion in a particular region.

The above object of the invention is achieved by the following configuration.

(1) A micro-electro mechanical device including a movable portion supported so as to be elastically displaced by an elastic supporting portion and a plurality of driving units which apply physical action forces whose directions are different from each other to the movable portion, and rotationally displacing the movable portion in both directions by the physical action forces in which, when the time from a state where the movable portion is rotationally displaced and stopped in a first direction to a state where the movable portion is rotationally displaced in a second direction different from the first direction by generating a physical action force by a driving unit and then the movable portion reaches a final displacement position is defined as a transition time, the relation between an elastic force value of the elastic supporting portion and the transition time has a local maximum value which shows a maximum transition time in a specific elastic force value, and the elastic force value of the elastic supporting portion is an elastic force value below the local maximum value.

According to this micro-electro mechanical device, when the time from a state where the movable portion is rotationally displaced and stopped in a first direction to a state where the movable portion is rotationally displaced in a second direction different from the first direction by generating a physical action force by a driving unit and then the movable portion reaches a final displacement position is defined as a transition time, the relation between an elastic force value of the elastic supporting portion and the transition time has a local maximum value which shows a maximum transition time in a specific elastic force value, and the elastic force value of the elastic supporting portion is an elastic force value below the local maximum value. Thereby, the transition operation of the movable portion when the movable portion is displaced in both directions can be sped up.

The relationship between the elastic force value of the elastic supporting portion and the transition time may be obtained under a condition where a potential difference between the movable portion and an electrode of one of the driving portions is equal to 10 volts. Also, the elastic force value of the elastic supporting portion may be larger than 0 Nm.

(2) The micro-electro mechanical device according to the above (1) in which the movable portion is stopped by contact with a stop member disposed in the final displacement position.

According to this micro-electro mechanical device, when the movable portion reaches the final displacement position, the movable portion contacts the stop member and its displacement operation stops. Thereby, the movable portion can be kept from being displaced beyond the final displacement position to generate large vibration.

(3) The micro-electro mechanical device according to the above (1) or (2) in which the physical action forces are applied to a plurality of points of action of the movable portion.

According to this micro-electro mechanical device, the physical action forces are applied to a plurality of points of action of the movable portion. Thereby, the movable portion can be driven in both directions.

(4) The micro-electro mechanical device according to any one of the above (1) to (3) in which the physical action forces which cause the movable portion to be displaced in the first direction and the second direction by the driving units are electrostatic forces.

According to this micro-electro mechanical device, since the physical action forces are electrostatic forces, high-speed rotational displacement of the movable portion is allowed.

(5) The micro-electro mechanical device according to any one of the above (1) to (4) in which the shape of the movable portion in plan view is a quadrangular shape.

According to this micro-electro mechanical device, when a plurality of the movable portions are arranged one-dimensionally or two-dimensionally, the movable portion is quadrangular. Thereby, the clearance between adjacent movable portions becomes small, and consequently the installation efficiency of the movable portions is enhanced.

(6) The micro-electro mechanical device according to any one of the above (1) to (5) in which the waveform of the physical action forces which rotationally displaces the movable portion includes any one of a rectangular wave, a sine wave, a cosine wave, a sawtooth wave, and a triangular wave.

According to this micro-electro mechanical device, the movable portion is rotationally displaced by a waveform including any one of a rectangular wave, a sine wave, a cosine wave, a sawtooth wave, and a triangular wave.

(7) The micro-electro mechanical device according to any one of the above (1) to (6) in which the supporting portion which supports the movable portion in an elastically displaceable manner is made of a polymeric material.

According to this micro-electro mechanical device, by using a high polymer material having a low elastic modulus, an elastic force generated when the elastic supporting portion is configured as a supporting portion can be suppressed low. In this case, the size of the supporting portion does not need to be made too small in order to generate a small elastic force.

(8) The micro-electro mechanical device according to any one of the above (1) to (6) in which the supporting portion which supports the movable portion in an elastically displaceable manner is made of any one of a metallic material, a resin material, and a hybrid material of the metallic material and the resin material.

According to this micro-electro mechanical device, the elastic supporting portion can be formed as a small piece by using the metallic material. Thereby, the degree of freedom in the design of the shape of the device can be improved, and the device itself can be miniaturized. Further, the size of the elastic supporting portion does not need to be made too small by using the resin material. Also, by the hybrid material obtained by combining these materials, a desired elastic force can be set easily.

(9) The micro-electro mechanical device according to any one of the above (1) to (8), further including a control unit which drives the movable portion to control rotational displacement thereof.

According to this micro-electro mechanical device, since the control unit drives the movable portion, the movable portion can be controlled arbitrarily.

(10) A micro-electro mechanical device array including a plurality of the micro-electro mechanical devices according to any one of the above (1) to (9) arrayed one-dimensionally or two-dimensionally.

According to this micro-electro mechanical device array, by arraying a plurality of the micro-electro mechanical devices one-dimensionally or two-dimensionally, simultaneous operation by the plurality of devices is allowed. As a result, image signals can be processed at high speed, for example, when they are modulated.

(11) The micro-electro mechanical device array according to the above (10) in which each of the micro-electro mechanical devices has a driving circuit including a memory circuit, and one of electrodes provided in the movable portion and at least two or more fixed parts facing the movable portion is a signal electrode from which a device displacement signal from the driving circuit is input, and the other electrode is a common electrode.

According to this micro-electro mechanical device array, one of an electrode of the movable portion and electrodes provided in at least two or more fixed parts facing the movable portion is a signal electrode from which a device displacement signal from the driving circuit including a memory circuit is input, and the other electrode is a common electrode. Thereby, wiring lines when being arranged in an array are simplified.

(12) A light modulation device that is the micro-electro mechanical device according to any one of the above (1) to (9) in which the light modulation device rotationally displaces the movable portion to modulate the light that has entered the micro-electro mechanical device.

According to this light modulation device, a light modulation function is obtained by rotational displacement of a movable portion.

(13) The micro-electro mechanical light modulation device array comprising a plurality of the light modulation devices according to the above (12) arrayed one-dimensionally or two-dimensionally.

According to this micro-electro mechanical light modulation device array, by arraying a plurality of the light modulation devices one-dimensionally or two-dimensionally, simultaneous operation by the plurality of devices is allowed. As a result, image signals can be processed at high speed, for example, when they are modulated.

(14) The micro-electro mechanical light modulation device array according to the above (13) in which each of the light modulation devices has a driving circuit including a memory circuit, and one of electrodes provided in the movable portion and at least two or more fixed parts facing the movable portion is a signal electrode from which a device displacement signal from the driving circuit is input, and the other electrode is a common electrode.

According to this micro-electro mechanical light modulation device array, one of an electrode of the movable portion and electrodes provided in at least two or more fixed parts facing the movable portion is a signal electrode from which a device displacement signal from the driving circuit including a memory circuit is input, and the other electrode is a common electrode. Thereby, wiring lines when being arranged in an array are simplified.

(15) An image forming apparatus including: a light source; the light modulation device according to the above (12) or the micro-electro mechanical light modulation device array according to the above (13) or (14); an illumination optical system which irradiates the light modulation device or the micro-electro mechanical light modulation device array with the light from the light source; and a projection optical system which projects the light emitted from the light modulation device or the micro-electro mechanical light modulation device array onto an image formation surface.

According to this image forming apparatus, image formation can be performed at high speed using the light modulation device or the micro-electro mechanical light modulation device array.

[Effects of the Invention]

According to the micro-electro mechanical device the micro-electro mechanical device array, the light modulation device, the micro-electro mechanical light modulation device, the micro-electro mechanical light modulation device array, and the image forming apparatus using the same, of the invention, when the relation between an elastic force value of the elastic supporting portion and the transition time has the local maximum value which shows a maximum transition time in a specific elastic force value, and the elastic force value of the elastic supporting portion is set to an elastic force value below the local maximum value, the transition operation of the movable portion in both directions can be performed at high-speed even under the condition of the same applied voltage. Further, in a region having the above specific elastic force, a great effect in reduction of the transition time of the movable portion can be expected, even if the change of the elastic force is small.

BRIEF DESCRIPTION OF THE DRAWINGS

FIG. 1A is a perspective view of the micro-electro mechanical modulation device, and FIG. 1B is a longitudinal sectional view thereof.

FIG. 8A is a plan view, and FIG. 8B is a sectional view taken along the line $P_1$-$P_1$ of FIG. 8A.

FIG. 9A is a plan view, FIG. 9B is a left side view, FIG. 9C is a plan view when viewed from the line $P_2$-$P_2$ of FIG. 9B, and FIG. 9D is a bottom view.

FIGS. 10A to 10C are graphs showing the transition time until the inclination of the movable portion is changed from −10 degrees to +10 degrees with respect to the elastic force of an elastic supporting portion in the cases where the size of the movable portion is set to 6 μm (FIG. 10A), 8 μm (FIG. 10B), and 10 μm (FIG. 10C), respectively, and the voltage to be applied is changed to 5 V, 10 V, 20 V, 30 V, and 40 V.

Further.

FIG. 13 is a table showing analysis conditions of Calculation Examples 1 to 6 that are examples of the device configuration according to the embodiment of the invention.

FIG. 14 is a table showing analysis conditions of Comparative Examples 1 and 2 that are comparative examples of the device configuration.

DETAILED DESCRIPTION OF EMBODIMENTS OF THE INVENTION

Hereinafter, a micro-electro mechanical device, a micro-electro mechanical device array, a light modulation device, a micro-electro mechanical light modulation device, a micro-electro mechanical light modulation device array, and an image forming apparatus using the same according to preferred embodiments of the invention will be described in detail with reference to the accompanying drawings.

Although the micro-electro mechanical device according to an embodiment of the invention for will be described below taking a micro-electro mechanical light modulation device having a light modulation function and a micro-electro mechanical light modulation device array as examples, the invention is not limited thereto.

Figure 1A:
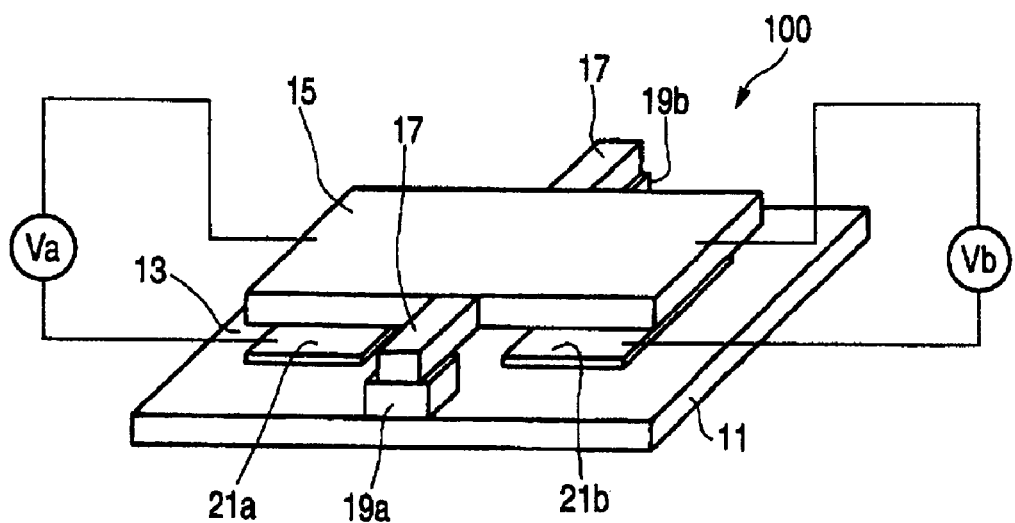
FIGS. 1A and 1B are conceptual diagrams of a micro-electro mechanical modulation device according to an embodiment of the invention, and particularly.
Figure 1B:
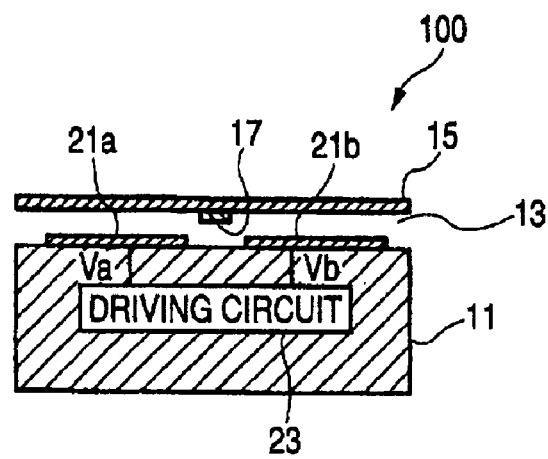

FIGS. 1A and 1B are conceptual diagrams of the micro-electro mechanical modulation device according to the embodiment of the invention. Particularly, FIG. 1A is a perspective view of the micro-electro mechanical modulation device, and FIG. 1B is a longitudinal sectional view thereof.

The micro-electro mechanical modulation device 100 of this embodiment includes, as basic components, a substrate 11, a small piece-shape movable portion 15 arranged parallel to the substrate 11 via a void 13, a hinge 17 that is an elastic supporting portion connected to the surface of the movable portion 15 on the side of the substrate 11 so as to support the movable portion 15, spacers 19a and 19b which is disposed on the substrate 11 and which support the movable portion 15 via the hinge 17, and a first address electrode 21a and a second address electrode 21b that are fixed electrodes arranged on both sides of the hinge 17 on the top face of the substrate 11. Further, as for the movable portion 15, the movable portion 15 itself may have conductivity, or may have a movable electrode in a portion thereof. Furthermore, a driving circuit 23 is provided in the substrate 11. This configuration enables the movable portion 15 to be rotationally displaced by the swing of the hinge 17. As a result, it becomes possible to rotationally drive the movable portion 15 in an arbitrary direction about the hinge 17 in accordance with a voltage applied by the driving circuit 23.

Furthermore, the driving circuit 23 applies a voltage, which generates a potential difference between the movable portion 15 (movable electrode) and the first address electrode 21a and between the movable portion 15 (movable electrode) and the second address electrode 21b.

In the micro-electro mechanical modulation device 100, the top face of the movable portion 15 may serve as a light-reflecting portion (micro mirror portion). In the case where the planar shape of the movable portion 15 is a quadrangular shape and a plurality of the movable portions 15 are arrayed one-dimensionally or two-dimensionally, the clearance between adjacent movable portions 15 becomes small. Thus, the installation efficiency is increased. In addition, the micro-electro mechanical modulation device 100 according to this embodiment of the invention may serve as a light modulation switch, an optical changeover switch or an electric switch by appropriately selecting the material of the movable portion 15 or by additionally providing a short-circuit contact. Furthermore, it is possible to switch sonic waves, fluids or heat rays or switch RF signals.

In this embodiment, the movable portion 15 becomes in contact with a stop member and is stopped when the movable portion 15 reaches a final displacement position of the rotational operation in a particular direction. This configuration prevents the movable portion 15 from being displaced beyond the final displacement position and prevents large vibration. In the illustrated example, the surface of the movable portion 15 is covered with an insulating material. The first address electrode 21a and the second address electrode 21b may serve as the stop members. That is, in this configuration, the micro-electro mechanical modulation device 1000 is a contact-type micro-electro mechanical modulation device.

The micro-electro mechanical modulation device 100 basically operates to apply a voltage to the first address electrode 21a, the second address electrode 21b and the movable portion 15, respectively to thereby swing and displace the movable portion 15 with the hinge 17 serving as a swing center. That is, when the movable portion 15 serves as the micro mirror portion, the reflecting direction of light, which is radiated onto the micro mirror portion, is switched.

Specifically, when the driving circuit 23 gives a potential difference between the movable portion 15 and the first and second address electrodes 21a, 21b, an electrostatic force is generated as a physical action force between the movable portion 15 and the first and second address electrodes 21a, 21b. As a result, a rotary torque centering on the hinge 17 acts on the movable portion 15. The strength of the electrostatic force to be generated at this time is dependent on the dielectric constant of an ambient atmosphere, the area (electrode area) of the movable portion 15, an applied voltage, and the electrode distance between the movable portion 15 and the address electrodes 21a, 21b.

It is assumed that the potential difference between the movable portion 15 and the first address electrode 21a is set to Va and that the potential difference between the movable portion 15 and the second address electrode 21b is set to Vb. For example, when Va>Vb, the electrostatic force generated between the first address electrode 21a and the movable portion 15 is larger than that generated between the second address electrode 21b and the movable portion 15, and thus the movable portion 15 is tilted so that its left side descends in FIG. 1B. On the contrary, when Va<Vb, the electrostatic force generated between the second address electrode 21b and the movable portion 15 is larger than that generated between the first address electrode 21a and the movable portion 15, and thus the movable portion 15 is tilted so that its right side descends in FIG. 1B.

In this way, the movable portion (movable electrode) 15, the first address electrode 21a, the second address electrode 21b and the driving circuit 23 serve as a driving portion that rotationally displaces the movable portion 15. Since the physical action force applied to the driving portion to the movable portion 15 is the electrostatic force, high-speed rotational displacement of the movable portion 15 can be achieved.

In addition, the physical action force caused to act on the movable portion 15 may be physical action forces other than the electrostatic force. As the other physical action forces, an electromagnetic force generated by an electromagnet, an electrostriction generated by a piezo-electric device, and arbitrary force generated by a mechanical device may be adopted.

In this way, the micro-electro mechanical modulation device 100 includes the movable portion 15, which is displaced in the both directions, and the movable portion 15 has a switching function. The movable portion 15 is rotationally displaced against gravity and the elastic force of the hinge 17 by a plurality of driving portions (for example, the movable electrode of the movable portion 15, the first address electrode 21a, the second address electrode 21b, and the driving circuit 23), which apply physical action forces. Although a detailed description will be made below, the micro-electro mechanical modulation device 100 of this embodiment has a feature in that the elastic restoring force of the hinge 17 is positively weakened, and the transition operation is performed using the electrostatic force that is a physical action force as a main driving force.

Next, with reference to FIGS. 2 and 3, the operation of the micro-electro mechanical modulation device 100 according to this embodiment of the invention will be described in detail.

Figure 2A:
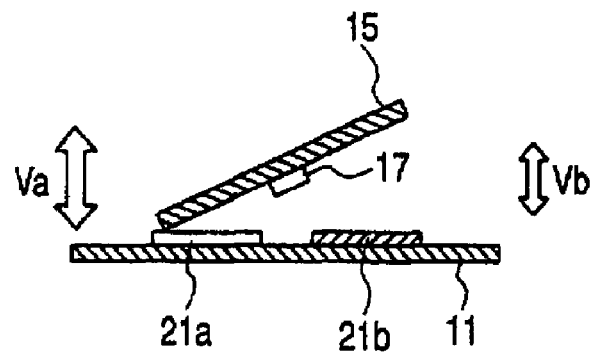
FIGS. 2A to 2C are conceptual diagrams showing an operation process of the micro-electro mechanical modulation device.
Figure 2B:
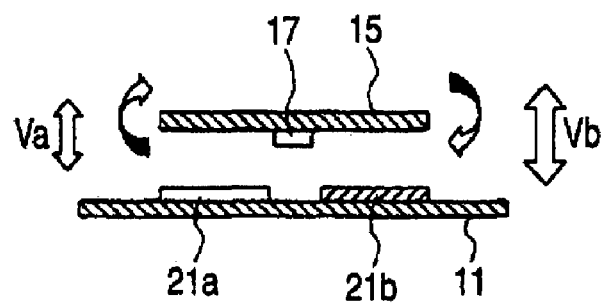
Figure 2C:
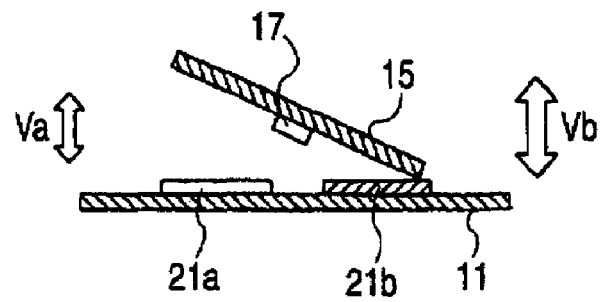

FIGS. 2A to 2C are conceptual diagrams showing the operation process of the micro-electro mechanical modulation device 100.

If the potential difference Va between the first address electrode 21a and the movable portion 15 is made larger than the potential difference Vb between the second address electrode 21b and the movable portion 15 in a state where the voltage is not applied from the driving circuit 23, an electrostatic force by which the movable portion 15 is attracted toward the first address electrode 21a is applied to the movable portion. As shown in FIG. 2A, this electrostatic force twists the hinge 17 counterclockwise against the elastic force of the hinge 17 to tilt the movable portion 15 to the left side. At this time, the elastic energy whose quantity is in proportional to the swing angle of the hinge 17 is accumulated in the hinge 17.

Then, the movable portion 15 is held in a state where the movable portion 15 is tilted to the left side by continuing to apply the potential difference Va, which generates a larger electrostatic force between the movable portion 15 and the first address electrode 21a than the elastic energy accumulated in the hinge 17.

Next, as shown in FIG. 2B, the potential difference Va between the movable portion 15 and the first address electrode 21a is removed to release the elastic energy accumulated in the hinge 17, and the potential difference Vb, which generates an electrostatic force between the movable portion 15 and the second address electrode 21b, is applied. Then, the movable portion 15 begins to rotate clockwise.

Then, as shown in FIG. 2C, after the movable portion 15 becomes in contact with the second address electrode 21b, the movable portion 15 is held in a state where the movable portion 15 is tilted to the right side. Thereafter, whenever the potential differences Va and Vb are released and applied, the same operation is repeatedly performed.

In this way, the electrostatic force rotationally displaces the movable portion 15 to thereby cause a pull-in phenomenon that the tip of the movable portion 15 rapidly drops downward. Thereby, the movable portion 15 is attracted (stuck) to the substrate 11. That is, the movable portion 15 is displaced by an electrostatic force generated by a pull-in voltage to be applied to the movable electrode of the movable portion 15, the first address electrode 21a and the second address electrode 21b. By applying a pull-out voltage lower than the pull-in voltage to the first address electrode 21a, the movable portion 15 pulled toward the first address electrode 21a is held in the state where the movable portion 15 is pulled in (the state shown in FIG. 2C).

In the device 100 of the bi-directional driving rotational system, which has the movable portion 15 configured as described above, it is assumed that a voltage generating a potential difference Vb between the electrodes is applied to the second address electrode 21b and the electrode of the movable portion 15 (movable electrode) to cause the movable portion 15 to transit from $-\theta$ to $+\theta$. It is further assumed that the inertia moment of the device 100 is $J=J_1$. In this case, a transition time T until the rotation angle of the movable portion 15 reaches the final position $+\theta$ from the initial position $-\theta$ is determined by the supporting-portion elastic force K of the hinge 17, which may serve as an elastic supporting portion, or determined by a vibrational angular frequency $\omega$ according to the supporting-portion elastic force K.

As a result of conducting detailed analysis about a relational expression $T=f_1$ between the transition time T and the supporting-portion elastic force K, and a relational expression $T=f_2$ between the transition time T and the vibrational angular frequency $\omega$, the inventors found the relations shown in FIG. 3.

Figure 3A:
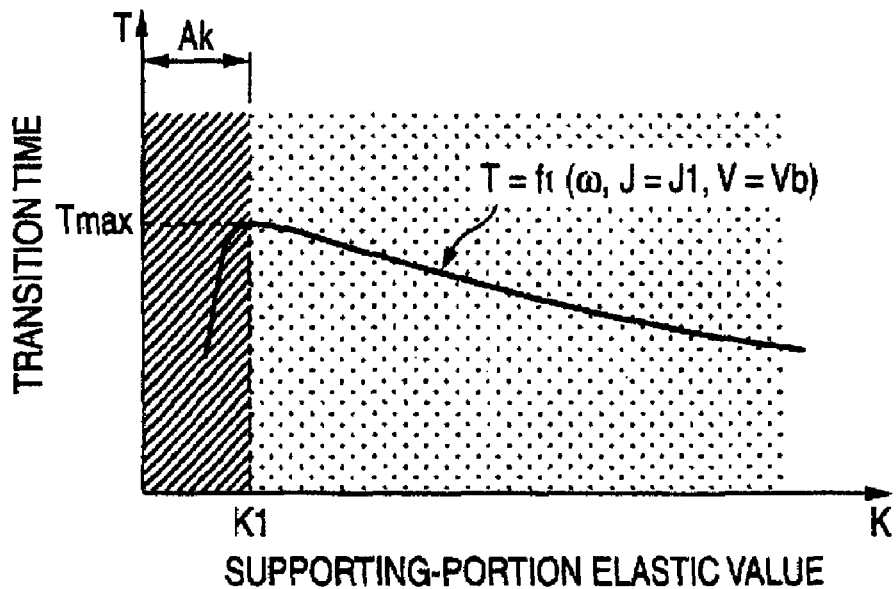
FIG. 3A is a graph representing a relational expression $T=f_1(K)$ between a transition time T and a supporting-portion elastic force K.
Figure 3B:
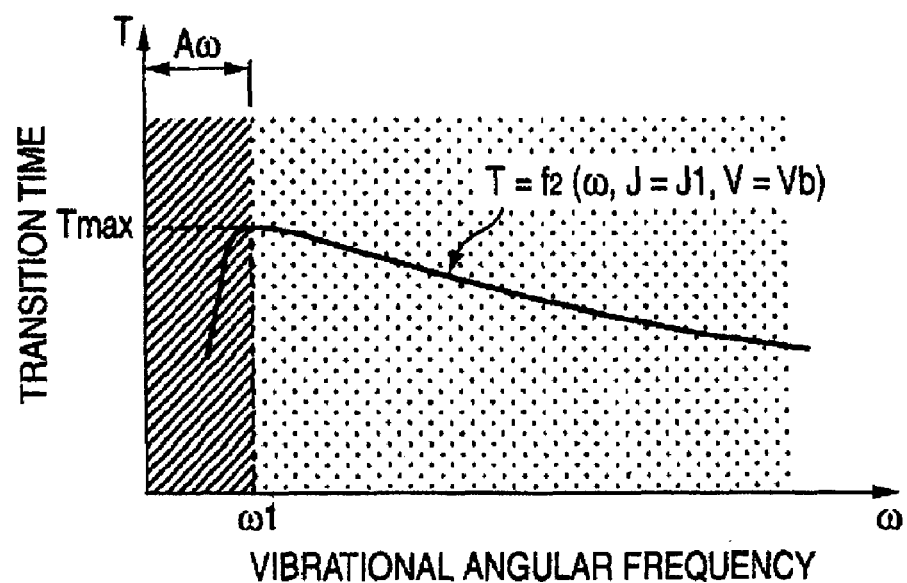
FIG. 3B is a graph representing a relational expression $T=f_2(\omega)$ of the transition time T and a vibrational angular frequency $\omega$.

FIG. 3A is a graph representing the relational expression $T=f_1(K, J=J_1, V=Vb)$ between the transition time T and the supporting-portion elastic force K. FIG. 3B is a graph representing the relational expression $T=f_2(\omega, J=J_1, V=Vb)$ between the transition time T and the vibrational angular frequency $\omega$.

That is, as shown in FIG. 3A, in the relation between the supporting-portion elastic force K and the transition time T, it has been confirmed that a region $A_K$ where the supporting-portion elastic force K is small and the transition time T changes from increasing to decreasing at a maximum transition time $T_{max}$, which is a boundary, exists. Generally, in the design of a device up to now, the supporting-portion elastic force K has been set to be in a region where the supporting-portion elastic force K is larger than a supporting-portion elastic force $K_1$ at which the transition time T takes the maximum value $T_{max}$. This is because the necessity of an elastic restoring force is simply considered more important without regard to the existence of the region $A_K$ described above.

Further, as shown in FIG. 3B, this is also applied similarly to the vibrational angular frequency $\omega$. That is, it has been confirmed that a region $A_\omega$ where the vibrational angular frequency $\omega$ is small and the transition time T changes from increasing to decreasing at the maximum transition time $T_{max}$, which is a boundary, exists.

In the device 100 according to this embodiment of the invention, a supporting portion is designed so that the supporting-portion elastic force falls within the elastic force region $A_K$ where the supporting-portion elastic force is smaller than the elastic force $K_1$ at which the transition time T takes the maximum transition time $T_{max}$, or so that a vibrational angular frequency falls within the region $A_\omega$ where the vibrational angular frequency is smaller than the vibrational angular frequency $\omega_1$ at which the transition time T takes the maximum transition time $T_{max}$. This makes it possible to shorten the transition time, to thereby easily manufacture a device, which achieves high-speed driving. Furthermore, the transition time changes rapidly in response to decrease in the supporting-portion elastic force K within the region $A_K$. Therefore, even if design change in a value of the hinge, which may serve as an elastic supporting portion, is a small value, the transition time can be changed greatly, and a device with a high response speed can be manufactured efficiently.

Further, the elastic supporting portion may be made of a high polymer material having a low elastic modulus besides metal such as aluminum. Thereby, an elastic force, which is generated when the elastic supporting member forms an elastic force, can be suppressed low. In this case, it is not necessary to make the size of the supporting portion does too small in order to generate a small elastic force. In addition, a metallic material, a resin material, a hybrid material of the metallic material and the resin material, and a dielectric material may be used. When the metallic material is used, the elastic supporting portion can be formed as a small piece. Thereby, the degree of freedom in the design of the shape of the device can be improved, and the device itself can be miniaturized. Further, when the resin material is used, it is not necessary to make the size of the elastic supporting portion too small. Also, when the hybrid material obtained by combining the metallic material with the resin material is used, a desired elastic force can be achieved easily. Furthermore, except for the above materials, any other materials may be used so long as they show the advantage of this embodiment.

Next, in order to verify the properties of the above device, an example in which simulation was performed on the basis of an analysis method shown below will be described.

Analysis Method

A time until a movable portion transits from a particular rotation angle −θ to another particular rotation of angle +θ and then reaches a final displacement position was calculated using an equation of motion shown in Expression (1). The electrode gap between the movable portion 15 (movable electrode) and the second address electrode 21a or 21b varies every moment according to the amount of displacement of the movable portion 15. Also, the electrostatic force acting between the electrodes varies with time. For this reason, the following operation was repeated. That is, an external force moment $F_n$ and an angle $\theta_n$ are obtained after the lapse of a certain time t, and an external force moment $F_{n+1}$ and an angle $\theta_{n+1}$ after the lapse of an infinitesimal time $\Delta_t$ are further found using the external force moment $F_n$. The relation between the angle of the movable portion and the lapsed time was calculated finally.

Equation of Motion:

$$J\frac{d^2\theta}{dt^2} + a\frac{d\theta}{dt} + K\theta = F_1 \qquad (1)$$

Inertia Moment:

$$J = \frac{ML_2^2}{12} = \frac{L_1 L_2^3 H \rho}{12} \qquad (2)$$

Viscous Damping Coefficient: a
Elastic Force of Supporting portion:

$$K = 2\frac{kG}{l_1} = \frac{kE}{l_1(1+v)} \qquad (3)$$

Here, $$k = \frac{h^3 l_2}{4}\left[\frac{16}{3} - 3.36\frac{h}{l_2}\left(1 - \frac{h^4}{12 l_2^4}\right)\right] \qquad (4)$$

External Force Moment:

$$F_1 = \frac{\varepsilon_0 SV^2}{2d^2} \times \frac{L_2}{4} = \frac{\varepsilon_0 L_1 L_2^2 V^2}{16d^2} \qquad (5)$$

Vibrational Angular Frequency:

$$\omega = \sqrt{\frac{k}{J} - \frac{a^2}{4J^2}} \qquad (6)$$

In each of the above equations, symbols with no description will be described below referring to FIG. 8.

Here, it is assumed that the initial rotation angle of the movable portion is $\theta_1$, $\omega_0^2 = K/J$, and $2\mu = a/J$. When the Equation (1) is solved, the following result is obtained.

$$\theta = \left\{\frac{F_1}{K} - \theta_1\right\} \cdot \left\{-\exp(-\mu t) \cdot \cos\left(\sqrt{\omega_0^2 - \mu^2}\, t\right) + \frac{F_1}{F_1 - K\theta_1}\right\} \qquad (7)$$

When coupled analysis of the rotation angle θ and the external force moment F is performed while it is assumed that the rotation angle and external force moment at a certain time t are $\theta_n$ and $F_{1n}$, respectively, and the rotation angle after lapse of an infinitesimal time is $\theta_{n+1}$, $\theta_{n+1}$ can be found from the following Equation (8)

$$\theta_{n+1} = \left\{\frac{F_1 n}{K} - \theta_1\right\} \cdot \left\{\begin{array}{c} -\exp(-\mu t) \cdot \cos\left(\sqrt{\omega_0^2 - \mu^2}\, t\right) + \\ \frac{F_1 n}{F_1 n - K\theta_1} \end{array}\right\} \qquad (8)$$

As shown in the above Equations (7) and (8), the coupled analysis can find the rotation angle θ and the external force moment F alternately, and consequently the vibration analysis for every time step can be performed.

Figure 4:
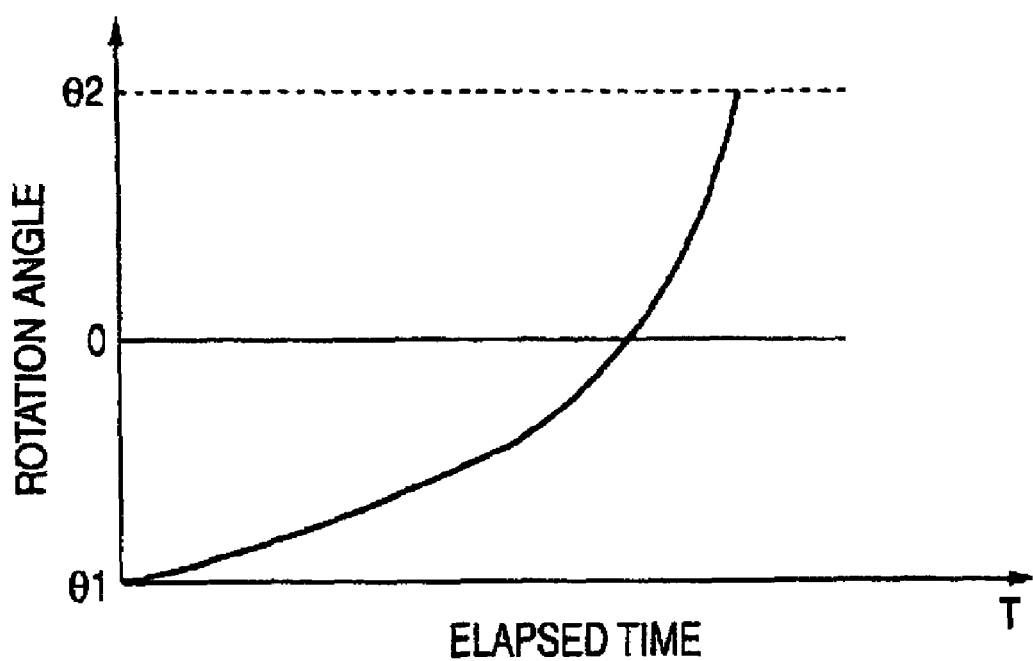
FIG. 4 is a graph showing changes in the rotation angle with respect to an elapsed time.

FIG. 4 shows changes in the rotation angle with the lapsed time. The rotation angle of the movable portion is $\theta_1$ in the initial position, and reaches $\theta_2$ after lapse of time T ($\theta_{n+1} = \theta_2$). If the time at which the movable portion is rotationally displaced and reaches $\theta_2$ is defined as T, this time T is the transition time. The above analysis was performed while the size of the movable portion, the supporting-portion elastic force and an applied voltage are changed variously.

Figure 5:
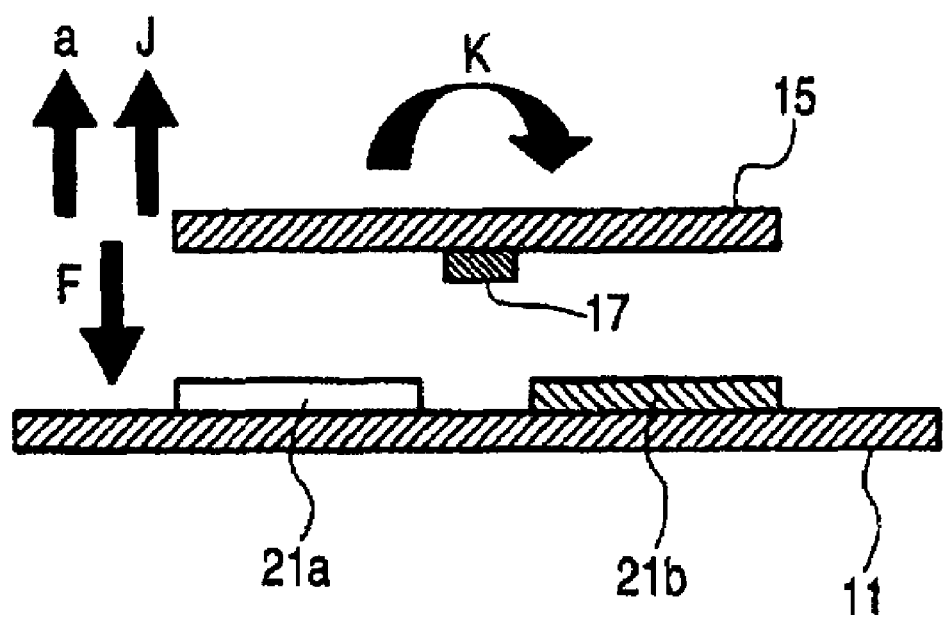
FIG. 5 is an explanatory view of the dynamic balance among external forces applied to the movable portion.

FIG. 5 is an explanatory view showing the dynamic balance among external forces applied to the movable portion 15. An external force moment F acts on the movable portion 15 in a direction in which the movable portion 15 is attracted toward the first address electrode 21a by giving a predetermined potential difference between the movable portion 15 and the first address electrode 21a. Simultaneously with this external force moment F; an inertia moment J according to the mass M of the movable portion 15 and a drag force caused by the viscous damping coefficient a of an ambient atmosphere are applied in the direction opposite to that of the external force moment F. Further, the supporting-portion elastic force K by which the hinge 17 serving as an elastic supporting portion returns from a twisted state is also applied in the opposite direction.

The viscous damping coefficient a is a coefficient proportional to speed, and generally, damping force is generated in proportion to speed. A damping force of a structure can be classified into the following two forms.

(1) External damping or viscous damping (which is caused by the viscosity of a fluid surrounding a structure, is proportional to speed, and acts from the stationary side)

(2) Internal damping or structural damping (which is caused by minute friction generated inside a structure, is proportional to strain rate, and acts by interaction in the interior)

The idea that a damping matrix is proportional to a mass [M] or a rigid [K] matrix is called Rayleigh damping. When the damping matrix is defined as [C] and proportional constants are defined as α and β, the damping matrix is expressed by the following Equation (9).

$$[C] = \alpha[M] + \beta[K]. \qquad (9)$$

Here, a case where [C] has only a term of α is called mass proportional damping, and a case where [C] has only a term of β is rigid proportional damping. If this equation is modified, the following Equation (10) is obtained when ξ is defined as a damping ratio and ω is defined as the vibrational angular frequency of a structure.

$$\xi = \alpha/2\omega + \beta\omega/2 \quad (10)$$

Figure 6:
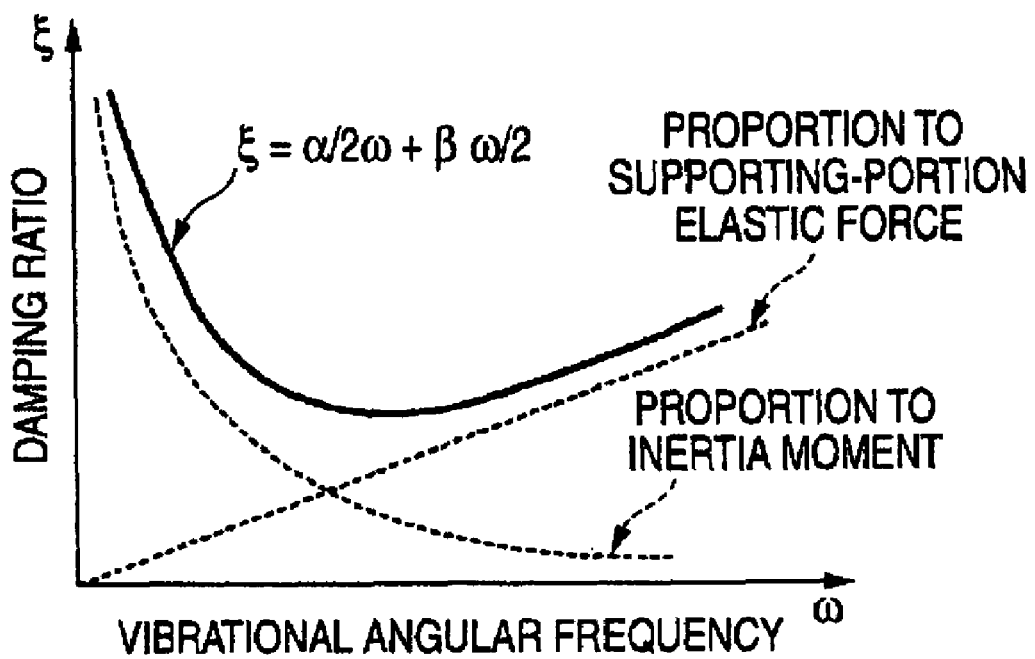
FIG. 6 is an explanatory view showing changes in a damping ratio with respect to the vibrational angular frequency.

According to the above Equation (10), as shown in FIG. 6, the influence of rigidity increases in a region where the vibrational angular frequency ω is small, and the influence of mass increases in a region where ω is large. (Reference: "Vibration Model and Simulation" (co-written by Kihachiro TANAKA•Shozou SAEGUSA, and issued by Industry and Science Systems Co., Ltd.)

Figure 7:
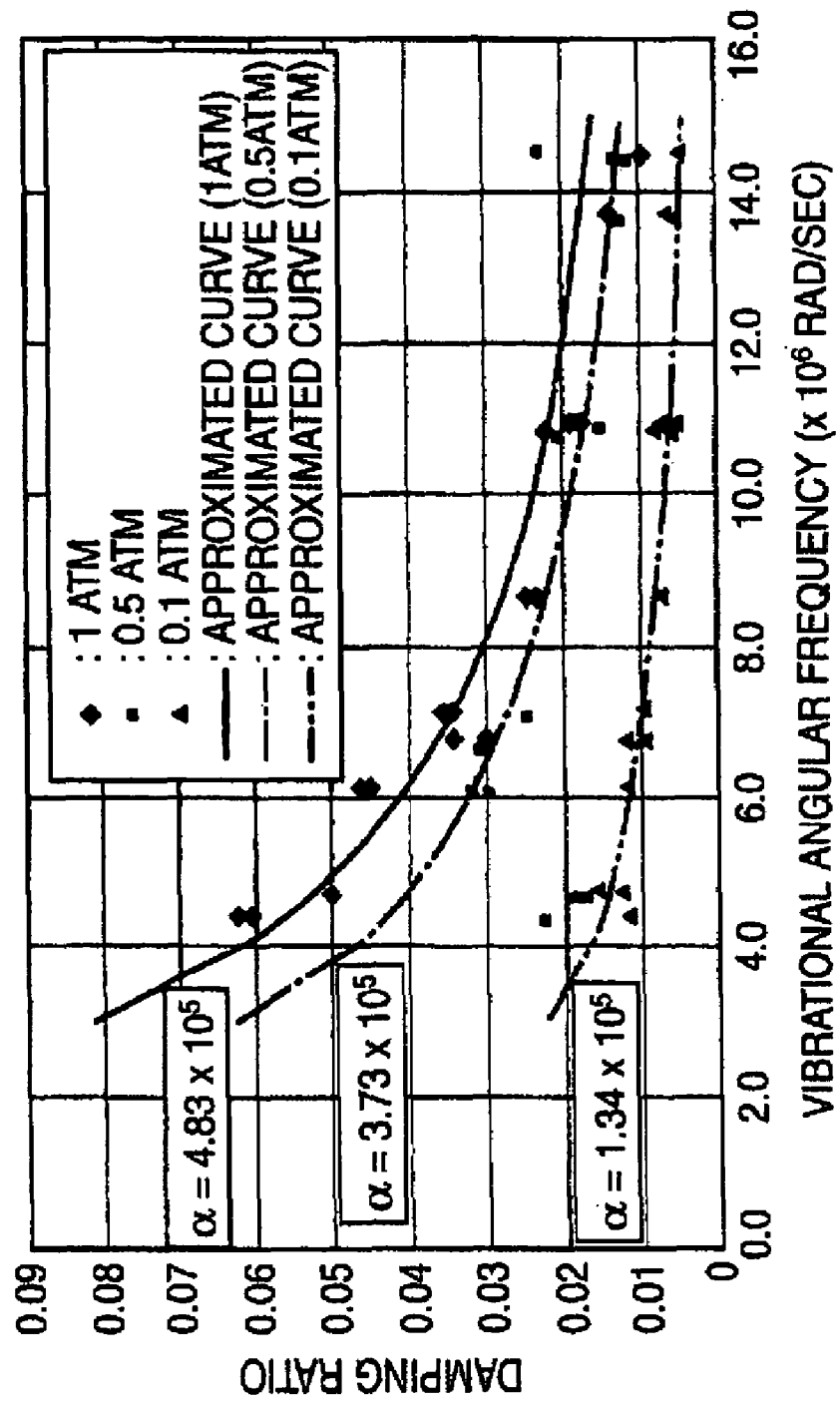
FIG. 7 is a graph showing changes in the damping ratio with respect to the vibrational angular frequency when rotational-system devices, which are different in structure, are caused to vibrate freely under different viscous conditions, respectively.

FIG. 7 is a graph showing changes in the damping ratio to the vibrational angular frequency when rotational system devices which are different in structure are caused to vibrate freely under different viscous conditions, respectively. In this drawing, a fitting curve is calculated for every viscous condition. This fitting curve is fitted on the basis of only a term of α/2ω. Since the fitting result is good, it can be understood that it is reasonable to treat the present rotational system device as the mass proportional damping. Then, the behavior of the rotational system device under each viscous condition was used for simulation analysis by using the value of α in the drawing. The viscous damping coefficient a can be expressed like the following Equation (11).

$$\alpha = 2\xi\sqrt{JK} \quad (11)$$

Analysis Conditions

Next, on the basis of the above analysis method, an analysis was performed using the following variation values and fixed values. It is assumed that the movable portion 15 is square, that the variation values of the hinge 17 are determined depending on the length of the movable portion 15 so that the hinge 17, which may serve as an elastic supporting portion, is hidden under the movable portion 15. Aluminum is used as the material of the movable portion 15.

a) Variation Values
Length of movable portion: $L_1$
Width of movable portion: $L_2$ $(=L_1)$
Length of supporting portion: $I_1$ $(=(L_1-2.2 \mu m)/2)$
Width of supporting portion: $I_2$ $(=0.6 \mu m)$
Thickness of supporting portion: h $(=0.05 \mu m)$
Mass of movable portion: M
Distance between electrodes: d
Potential difference between electrodes: V
b) Fixed Values
Thickness of movable portion: H=0.5 μm
Density of movable portion: ρ=2.7 g/cm³
Young's modulus of supporting portion: E=68.85 GPa
Poisson's ratio of supporting portion: ν=0.36
Contact angle: θ=10 degrees
Viscosity coefficient: a (set in an environment of 1 atm)

Figure 8A:
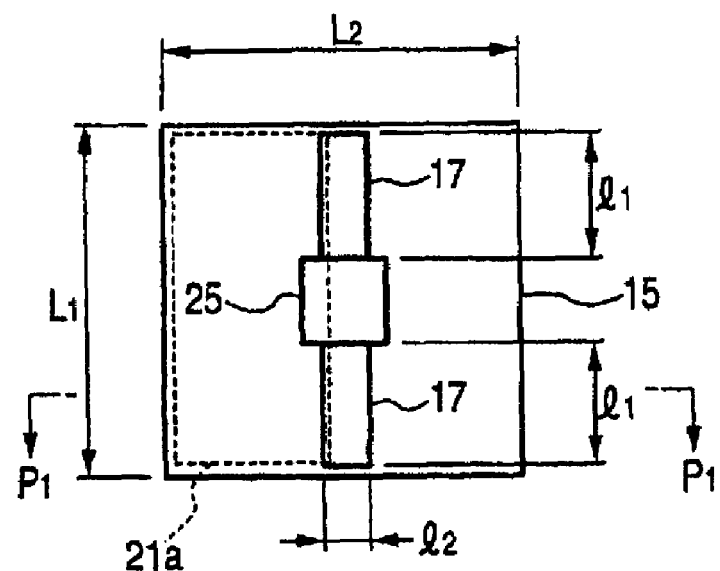
FIGS. 8A and 8B are diagrams showing the configuration of a model of the micro-electro mechanical modulation device according to the embodiment of the invention, and particularly.
Figure 8B:
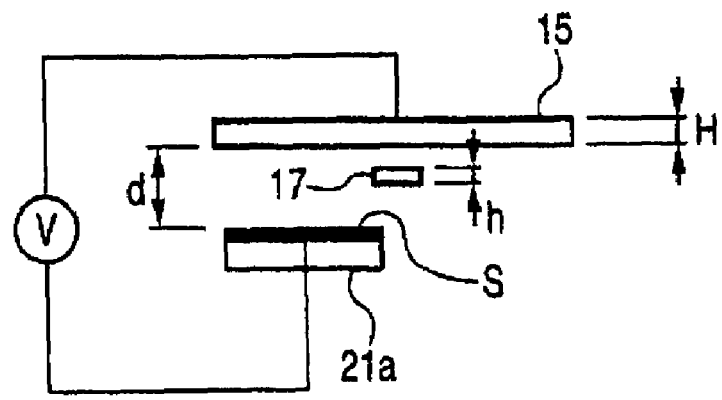

FIGS. 8A and 8B are diagrams showing the configuration of a model of the micro-electro mechanical modulation device according to this embodiment of the invention, and particularly, FIG. 8A is a plan view, and FIG. 8B is a sectional view taken along the line $P_1$-$P_1$ of FIG. 8A.

In this configuration, the movable portion 15 is formed integrally with a hinge post 25 to which a base end of the hinge 17 is connected. The other end of the hinge 17 is connected to a hinge fixing portion, which is not shown. By generating a potential difference V between the first address electrode 21a and the movable portion 15 in a state where the movable portion 15 is inclined so as to separate from the first address electrode 21a, to thereby drive the movable portion 15 to approach the first address electrode 21a, and the transition time of the displacement is calculated.

Figure 9B:
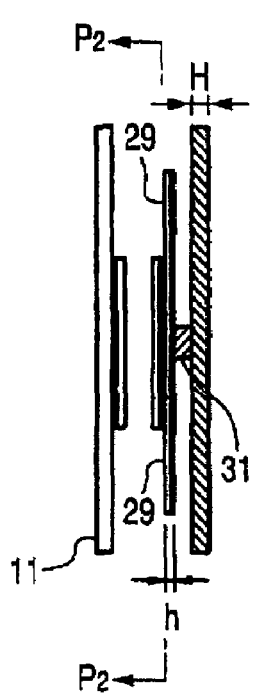
FIGS. 9A to 9D are diagrams showing the configuration of a model of a micro-electro mechanical modulation device of a comparative example, and particularly.
Figure 9A:
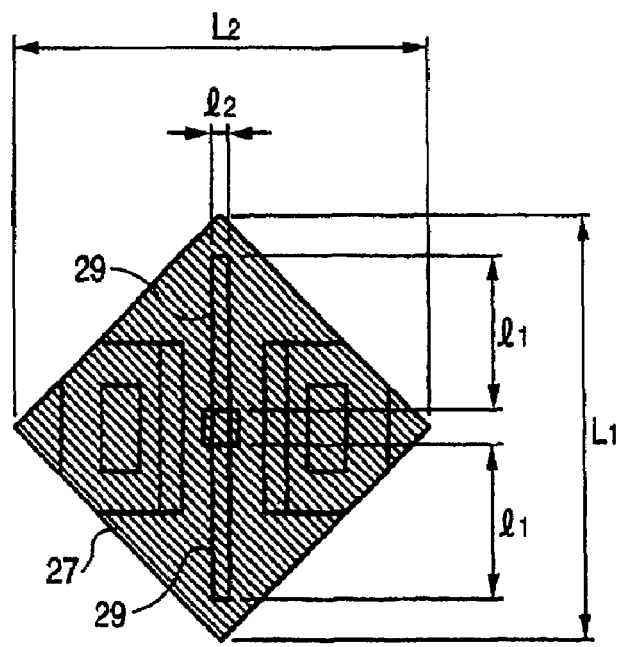
Figure 9C:
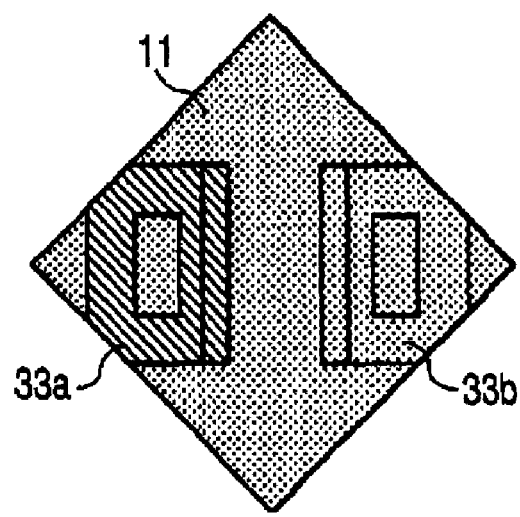
Figure 9D:
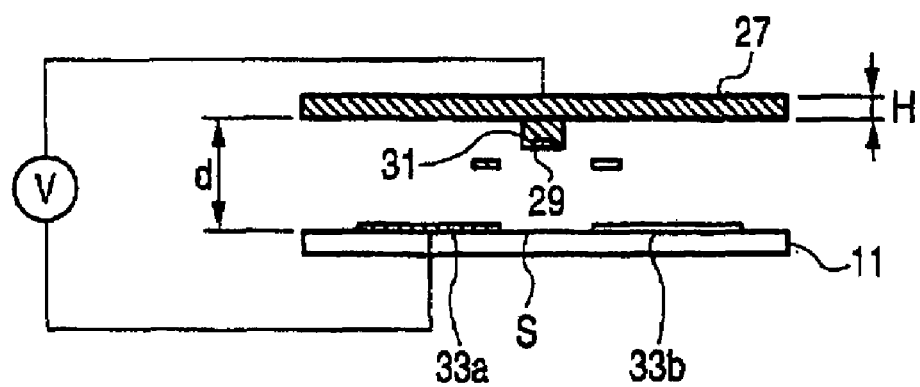

FIGS. 9A to 9D are diagrams showing the configuration of a model of a comparative example to be compared with the model of the micro-electro mechanical modulation device according to the embodiment the invention. Particularly, FIG. 9A is a plan view, FIG. 9B is a left side view, FIG. 9C is a plan view when viewed from the line $P_2$-$P_2$ of FIG. 9B, and FIG. 9D is a bottom view.

In this configuration, a movable portion 27 is formed integrally with a supporting post 31 to which a base end of a hinge 29 is connected. The other end of the hinge 29 is connected to a hinge fixing portion (not shown). By generating a potential difference V between a first address electrode 33a and the movable portion 27 in a state where the movable portion 27 is attracted and stuck to a second address electrode 33b, to thereby drive the movable portion 29 to approach the first address electrode 33a, and the transition time of the displacement is calculated.

Analysis Results

Figure 10A:
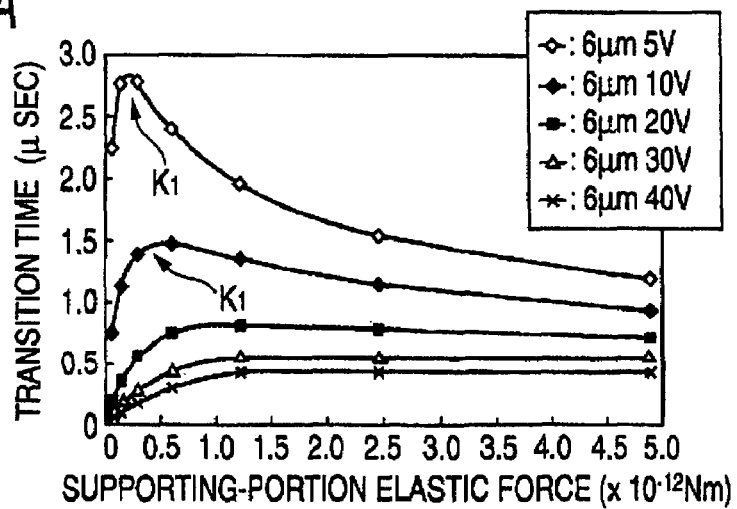
FIGS. 10A to 10C are graphs showing the analysis results of the transition time, and particularly.
Figure 10B:
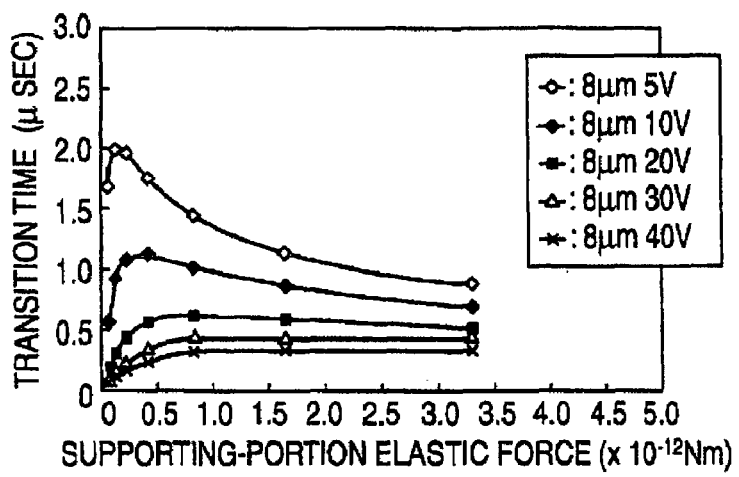
Figure 10C:
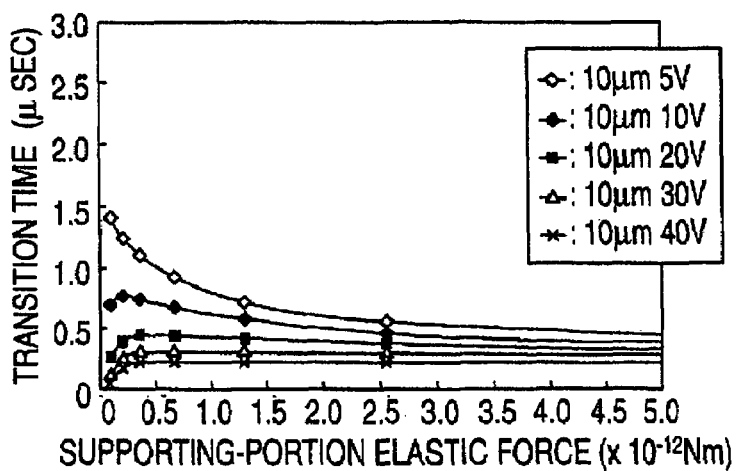

FIGS. 10A to 10C are graphs showing the analysis results of the transition time. Particularly, FIGS. 10A to 10C are graphs showing the transition time until the inclination of the movable portion 15 is changed from −10 degrees to +10 degrees with respect to the elastic force of an elastic supporting portion in the case where the size of the movable portion 15 is set to 6 μm (FIG. 10A), 8 μm (FIG. 10B), and 10 μm (FIG. 10C), respectively, and the applied voltage is changed to 5 V, 10 V, 20 V, 30 V, and 40 V. Here, it is assumed that the environmental atmosphere of the device is 1 atm. As shown in each of FIGS. 10A, 10B, and 10C, a local maximum value $K_1$ of the supporting-portion elastic force where the transition time takes the maximum value exists on the curve showing the relation between the transition time and the supporting-portion elastic force when the movable portion has an arbitrary size (inertia moment), and an arbitrary voltage is applied. If the voltage is more than 20 V, it is difficult to find the supporting-portion elastic force, which is the local maximum value, because of the scale of axis of ordinate. However, a definite local maximum value exists in terms of numerical values.

In the supporting-portion elastic force within a region where the supporting-portion elastic force is smaller than the local maximum value $K_1$, as the movable portion 15 gets smaller, the change of the transition time increases. If a condition, such a driving voltage, is chosen appropriately, a transition time, which is shorter than that in a region where the supporting-portion elastic force is larger than $K_1$, can be achieved. Thus, if an elastic supporting portion is designed so as to have the supporting-portion elastic force within the region where the supporting-portion elastic force is smaller than $K_1$, the transition time can be shortened, or a large change in the transition time can be expected by small changes in design values of the elastic supporting portion.

Therefore, in the micro-electro mechanical modulation device according to the embodiment of the invention, when the relation between an elastic force value of the elastic supporting portion and the transition time has the local maximum value $K_1$, which shows a maximum transition time; at a particular elastic force value. When the elastic force value of the elastic supporting portion is designed to have an elastic force value below the local maximum value $K_1$, the transition time can be shortened, and high-speed driving is allowed.

Figure 11:
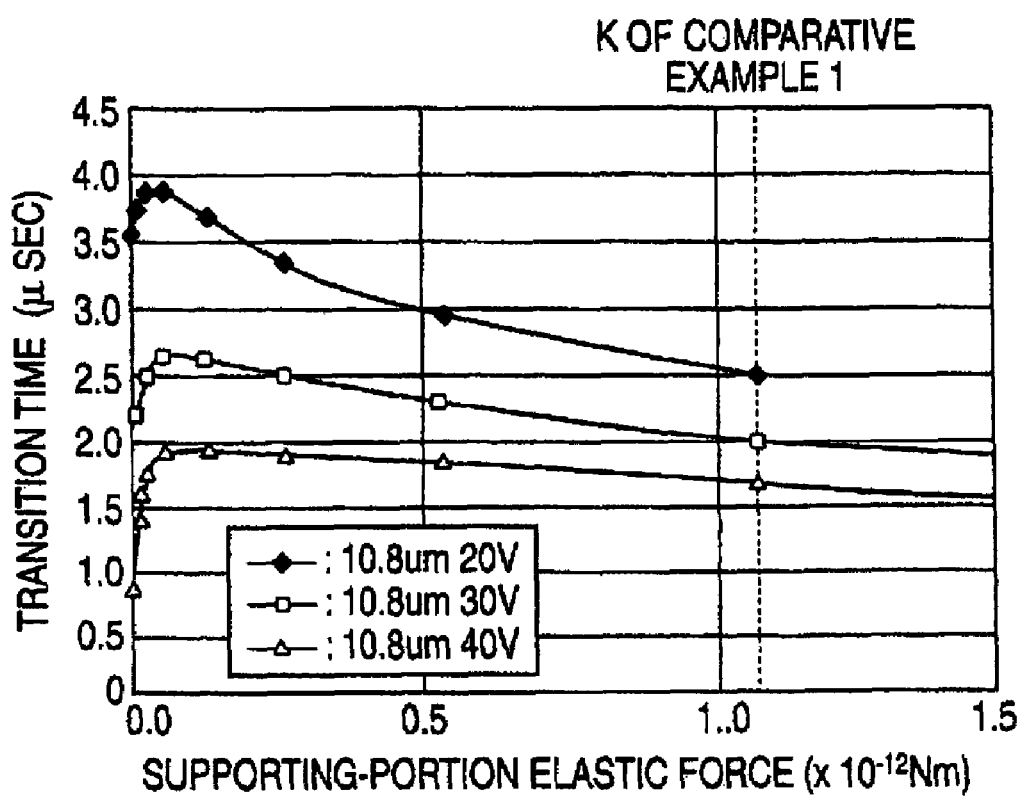
FIG. 11 is a graph showing the transition time until the inclination of the movable portion of the comparative example is changed from −10 degrees to +10 degrees with respect to the supporting-portion elastic force in the case where the movable portion has 10.8 μm in size and the applied voltage is changed to 20 V, 30 V and 40 V.

Further, FIG. 11 is a graph showing the transition time until the inclination of the movable portion of the comparative example is changed from −10 degrees to +10 degrees with respect to the supporting-portion elastic force in the case where the movable portion has 10.8 μm in size and the applied voltage is changed to 20 V, 30 V and 40 V.

Figure 12:
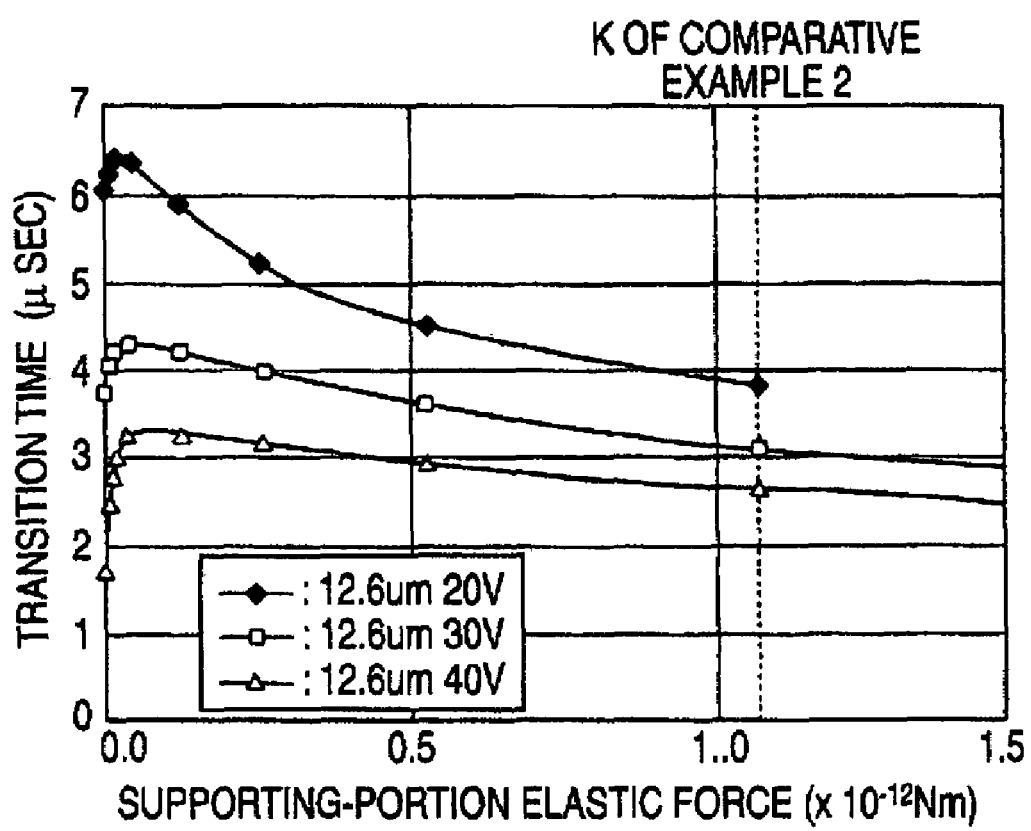
FIG. 12 is a graph showing the transition time with respect to the supporting-portion elastic force in the case where the device has the same configuration as that of FIG. 11 and the movable portion has 12.6 μm in size.

FIG. 12 is a graph showing the transition time with respect to the supporting-portion elastic force in the case where the device has the same configuration as that of FIG. 11 and the movable portion has 12.6 μm in size.

Analysis conditions of Calculation Examples 1 to 6, which are examples of this embodiment, and analysis conditions of Comparative Examples 1 and 2, which are that are comparative examples, are shown in FIGS. 13 and 14. The analysis results based on the individual analysis conditions of FIGS. 13 and 14 will be checked by comparison with FIGS. 10 to 12.

First, in the device having 6 μm in the length of the movable portion, the supporting-portion elastic force of Calculation Example 1 in which acrylic resin is used as the material of a supporting portion is $0.218 \times 10^{-12}$ Nm, and the supporting-portion elastic force of Calculation Example 2 in which silicone is used as the material of the supporting portion is $0.2355 \times 10^{-12}$ Nm. Referring to FIG. 10A, all of these supporting-portion elastic forces are smaller than the local maximum value $0.24 \times 10^{-12}$ Nm of the supporting-portion elastic force when the driving voltage is 5 V, and smaller than the local maximum value $0.50 \times 10^{-12}$ Nm of the supporting-portion elastic force when the driving voltage is 10 V.

Next, in the device having 8 μm in the length of a movable portion, the supporting-portion elastic force of Calculation Example 3 in which aluminum is used as the material of a supporting portion is $0.250 \times 10^{-12}$ Nm, the supporting-portion elastic force of Calculation Example 4 in which acrylic resin is used as the material of a supporting portion is $0.202 \times 10^{-12}$ Nm, and the supporting-portion elastic force of Calculation Example 6 in which silicone is used as the material of a supporting portion is $0.209 \times 10^{-12}$ Nm. Referring to FIG. 10B, all of these supporting-portion elastic forces are smaller than the local maximum value $0.40 \times 10^{-12}$ Nm of the supporting-portion elastic force when the driving voltage is 10 V, and smaller than the local maximum value $0.83 \times 10^{-12}$ Nm of the supporting-portion elastic force when the driving voltage is 20 V.

Next, in the device having 10 μm in the length of a movable portion, the supporting-portion elastic force of Calculation Example 6 in which aluminum is used as the material of a supporting portion is $0.225 \times 10^{-12}$ Nm. Referring to FIG. 10C, this supporting-portion elastic force is smaller than the local maximum value $0.25 \times 10^{-12}$ Nm of the supporting-portion elastic force when the driving voltage is 10 V, and the local maximum value $0.60 \times 10^{-12}$ Nm of the supporting-portion elastic force when the driving voltage is 20 V.

On the other hand, in the device of Comparative Example 1 having 7.64 μm in the length of a movable portion, the supporting-portion elastic force is $1.06 \times 10^{-12}$ Nm. Referring to FIG. 11, this supporting-portion elastic force is larger than the local maximum value when an arbitrary driving voltage is applied. Further, in the device of Comparative Example 2 having 8.91 μm in the length of the movable portion, the supporting-portion elastic force is $1.06 \times 10^{-12}$ Nm. Referring to FIG. 12, the supporting-portion elastic force is larger than the local maximum value when an arbitrary driving voltage is applied.

From the above, in the micro-electro mechanical modulation device according to this embodiment, an elastic force value of the elastic supporting portion and the transition time have such a relationship that when the elastic force value of the elastic supporting portion is equal to a certain value, the transition time takes a local maximum value, and the elastic force value of the elastic supporting portion is equal to or less than the certain value at which the transition time takes the local maximum value. Therefore, the transition operation of the movable portion in both directions can be performed at high-speed even under the condition of the same applied voltage.

Next, various modified examples to which the micro-electro mechanical modulation device of this embodiment can be applied will be described.

Figure 15A:
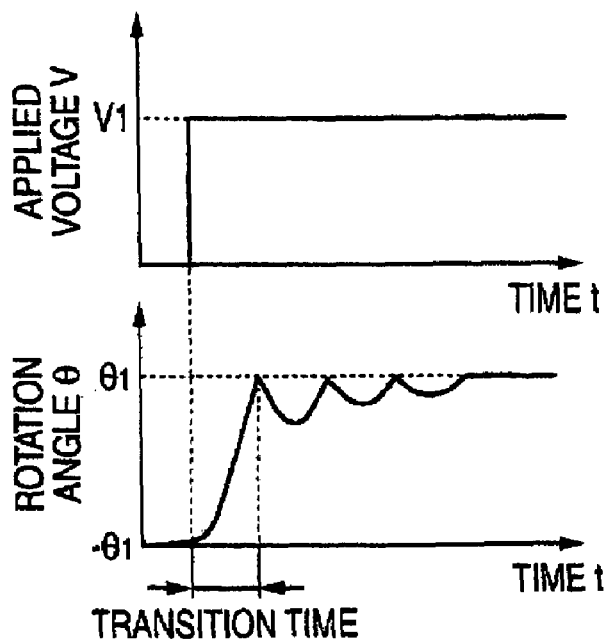
FIGS. 15A to 15B are explanatory views showing the waveform of voltages applied to an electrode of the micro-electro mechanical modulation device.
Figure 15B:
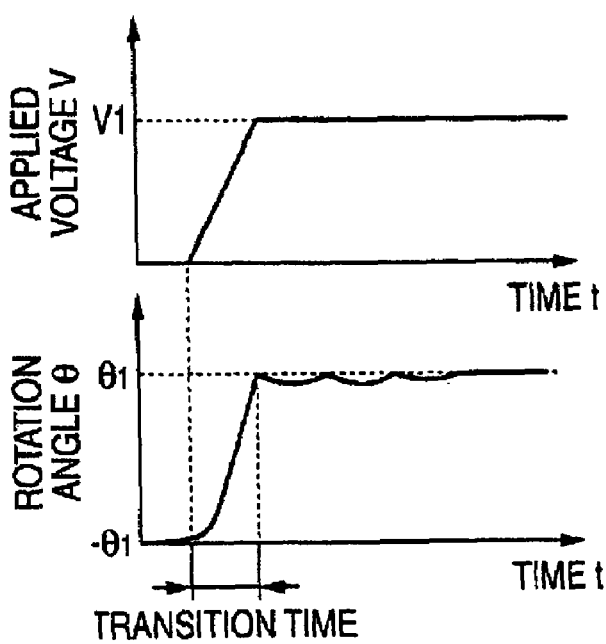

The applied voltage to the electrodes of the above-described micro-electro mechanical modulation device has such a waveform shown in FIG. 15A that a constant voltage V1 is applied with a rectangular shape. Accordingly, rotational operation of the movable portion is performed in short transition time. In contrast, as shown in FIG. 15B, the applied voltage may be controlled with a waveform, which gradually increases until the movable portion reaches the final displacement destination from the early stage of the rotational operation of the movable portion, so as not to gain the inertial force of the movable portion too much. In this case, the vibration after the movable portion has reached the final displacement destination can be suppressed.

The structure of the micro-electro mechanical modulation device is not limited to that shown in FIG. 1. The micro-electro mechanical modulation device may have a different structure. Other examples of the configuration of the micro-electro mechanical modulation device are shown in FIGS. 16A to 16C.

Figure 16A:
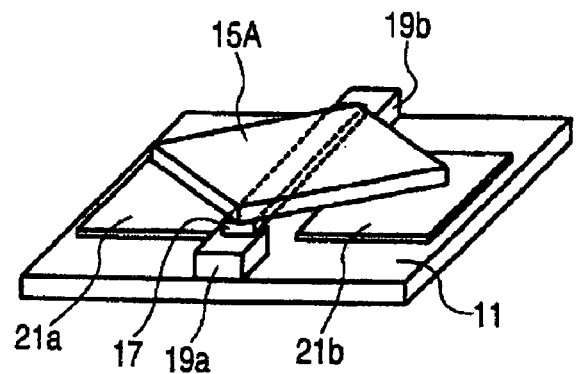
FIGS. 16A to 16C are perspective views showing other examples of the configuration of the micro-electro mechanical modulation device.

In a micro-electro mechanical modulation device of FIG. 16A, the hinge 17 is joined to a quadrangular movable portion 15a along its one diagonal line so that the diagonal line may become the axis of rotational operation. Both ends of the hinge 17 are supported by spacers 19a and 19b. According to this configuration, the inertial force of the rotational displacement of the movable portion 15a is reduced, which becomes advantageous to high-speed driving.

Figure 16B:
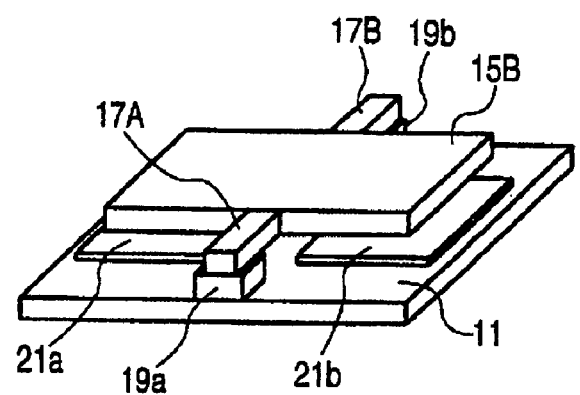

A micro-electro mechanical modulation device of FIG. 16B includes hinges 17A and 17B extending from both edges of a movable portion 15b, and spacers 19a and 19b which support the movable portion 15b on the substrate 11 via the hinges 17A and 17B. According to this configuration, the movable portion 27 can be rotationally displaced by the swing of the hinges 29 and 29 while the configuration of the device can be simplified.

Figure 16C:
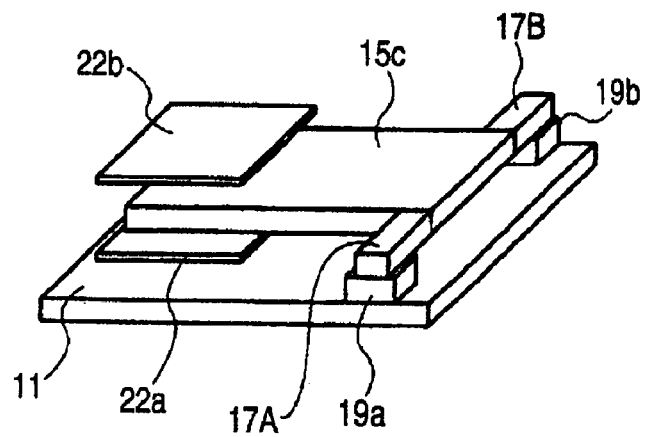

In a micro-electro mechanical modulation device of FIG. 16C, an end of a movable portion 15c is fixedly supported by the substrate 11 via hinges 17A and 17B and spacers 19a and 19b. That is, the movable portion 15c is configured in the shape of a cantilever beam such that its other end becomes a free end. Also, a first address electrode 22a is provided on the substrate 11 so as to face the free end of the movable portion 15c, and a second address electrode 22b formed in a counter substrate which is not shown is provided opposite to the first address electrode 22a with the movable portion 15c therebetween. Even according to this configuration, the movable portion 15 can be displaced at high speed by a low voltage.

Figure 17:
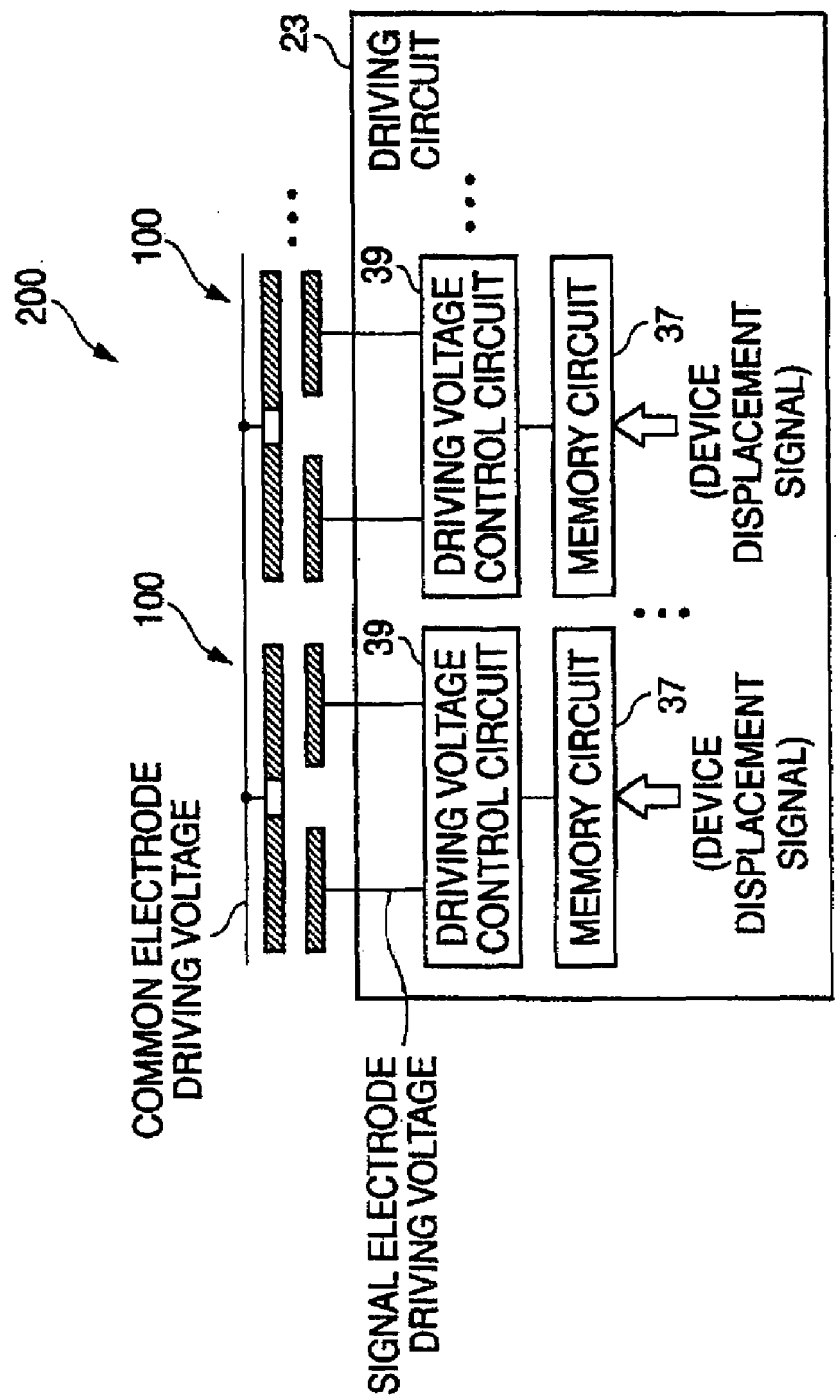
FIG. 17 is an explanatory view showing a configuration in which each of a plurality of micro-electro mechanical modulation devices has a driving circuit including a memory circuit.

FIG. 17 is an explanatory view showing a configuration in which each of a plurality of micro-electro mechanical modulation devices has a driving circuit including a memory circuit.

In a micro-electro mechanical modulation device array 200, each micro-electro mechanical modulation device 100 has the driving circuit 23 (see FIG. 1) including a memory circuit 37. Since the driving circuit includes such a memory circuit 37, a displacement signal which indicates the next displacement operation of the device can be written in advance in the memory circuit 37. That is, a device displacement signal is written in advance in the memory circuit 37. Thus, at the time of switching of the micro-electro mechanical modulation device array 200, modulation driving is performed on the basis of the device displacement signal stored in the memory circuit 37 of each micro-electro mechanical modulation device 100 by a driving voltage control circuit 39 which controls the applied voltage to the micro-electro mechanical modulation device 100.

As described above, when the micro-electro mechanical modulation device 100 is driven using the memory circuit 37, each of the plurality of devices 100 can be easily operated in an arbitrary drive pattern, and higher-speed active driving is allowed. In addition, although the configuration of the micro-electro mechanical modulation device array 100 of FIG. 1 is shown here, the invention is not limited thereto. Devices having other configurations may be adopted.

Figure 18:
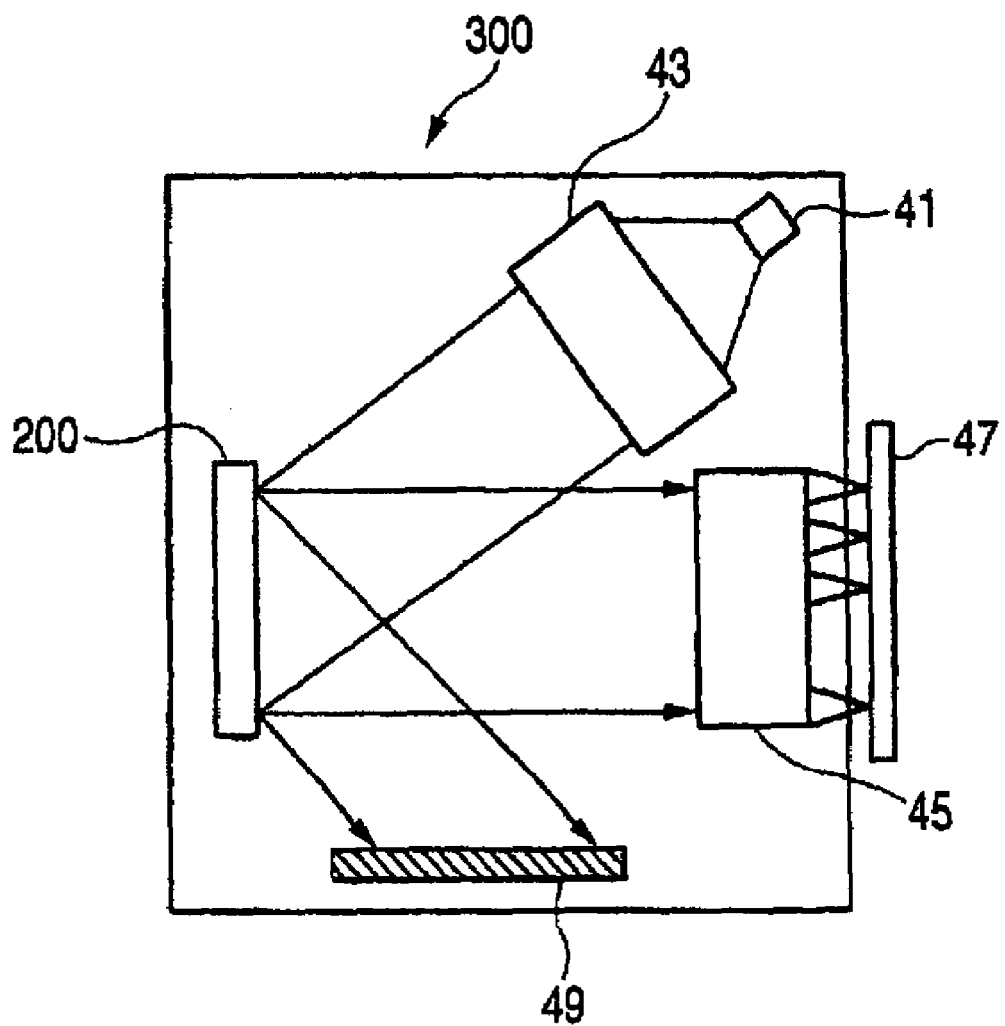
FIG. 18 is a view showing the schematic configuration of an exposure apparatus, which includes the micro-electro mechanical modulation device array according to the embodiment of the invention.

Next, an image forming apparatus configured using the micro-electro mechanical modulation device 100 will be described. Here, an exposure apparatus 300 will first be described as an example of the image forming apparatus. FIG. 18 is a view showing the schematic configuration of the exposure apparatus, which is configured using the micro-electro mechanical modulation device array according to the invention. The exposure apparatus 300 includes an illumination light source 41, an illumination optical system 43, the micro-electro mechanical modulation device array 200 in which a plurality of the micro-electro mechanical modulation devices 100 according to the above-described embodiment are arrayed two-dimensionally on the same plane, and a projection optical system 45.

The illumination light source 41 is a light source, such as a laser, a high-pressure mercury lamp, or a short arc lamp. The illumination optical system 43 is, for example, a collimating lens which makes planar light emitted from the illumination light source 41 into parallel beams. The parallel beams which have passed through the collimating lens enter into each micro-electro mechanical modulation device 100 of the micro-electro mechanical modulation device array 200. As a means for making planar light emitted from the illumination light source 41 into parallel beams, there is a method of arranging two microlenses in series in addition to the collimating lens. Further, parallel beams may be caused to enter the micro-electro mechanical modulation device array 200 by using a light source having a small light-emitting point, such as a short arc lamp, is used as the illumination light source 41 wherein the illumination light source 41 is considered as a point light source. Further, parallel beams may be caused to enter each micro-electro mechanical modulation device 100 of the micro-electro mechanical modulation device array 200 by using an LED array which has an LED corresponding to each of the micro-electro mechanical modulation devices 100 of the micro-electro mechanical modulation device array 200 as the illumination light source 41, and by causing the LED array to emit light in a state where the LED array and the micro-electro mechanical modulation device array 200 are caused to approach each other. In addition, when a laser is used as the illumination light source 41, the illumination optical system 43 may be omitted.

The projection optical system 45 is to project light onto a recording medium 47 that is an image formation surface. For example, the projection optical system is a microlens array which has a microlens corresponding to each micro-electro mechanical modulation device 100 of the micro-electro mechanical modulation device array 200.

Hereinafter, the operation of the exposure apparatus 300 will be described.

Planar light emitted from the illumination light source 41 enters the illumination optical system 43 where the planar light is made into parallel beams. Then, the parallel beams enter the micro-electro mechanical modulation device array 200. The reflection of the light which enters each micro-electro mechanical modulation device 100 of the micro-electro mechanical modulation device array 200 is controlled in response to an image signal. The light emitted from the micro-electro mechanical modulation device array 200 is projected onto an image formation surface of the recording medium 47 by the projection optical system 45. The projection light is projected onto the recording medium 47 while it moves in a scanning direction relative to the recording medium, so that a wide area can be exposed with high resolution. In this way, the light which enters a planar substrate of each modulation device can be made into parallel beams by providing the collimating lens on the side of a light incidence plane of the micro-electro mechanical modulation device array 200. In addition, reference numeral 49 in the drawing represents a light absorber which introduces OFF light.

This exposure apparatus 300 can be configured using a microlens array without being limited to using the collimating lens as the illumination optical system 43. In this case, each microlens of the microlens array corresponds to each micro-electro mechanical modulation device 100 of the micro-electro mechanical modulation device array 200, and is designed and adjusted so that the optical axis and focal plane of the microlens may coincide with the center of each light modulation device.

In this case, the light emitted from the illumination light source 41 is condensed on a region whose area is smaller than one device of the micro-electro mechanical modulation devices 100 by the microlens array, and enters the micro-electro mechanical modulation device array 200. The reflection of the light which enters each micro-electro mechanical modulation device 100 of the micro-electro mechanical modulation device array 200 is controlled in response to an image signal. The light emitted from the micro-electro mechanical modulation device array 200 is projected onto an image formation surface of the recording medium 47 by the projection optical system 45. The projection light is projected onto the recording medium 47 while it moves in a scanning direction relative to the recording medium, so that a wide area can be exposed with high resolution. In this way, since the light from the illumination light source 41 can be condensed by the microlens array, an exposure apparatus with improved light use efficiency can be realized.

In addition, the lens surface of the microlens may be a spherical surface, a hemispherical surface, etc. without being limited particularly. Further, the lens surface may a convex surface or a concave surface. Furthermore, a flat microlens array which has refractive index distribution may be adopted, and diffractive lenses, such as a Fresnel lens, binary optics, etc. may be arrayed. As the material of the microlens, there are transparent glass and resin, for example. The resin is excellent from the viewpoint of mass production, and the glass is excellent from the viewpoints of lifespan and reliability. As the glass, quartz glass, fused silica, alkali-free glass, etc. is preferable from an optical viewpoint. As the resin, acrylic resin, epoxy resin, polyester resin, polycarbonate resin, styrene resin, vinyl chloride resin, etc. are preferable. In addition, the resin includes photo-curable resin, thermoplastic resin, etc., and is appropriately selected according to a manufacturing process of the microlens.

Next, a projection apparatus will be described as another example of the image forming apparatus.

Figure 19:
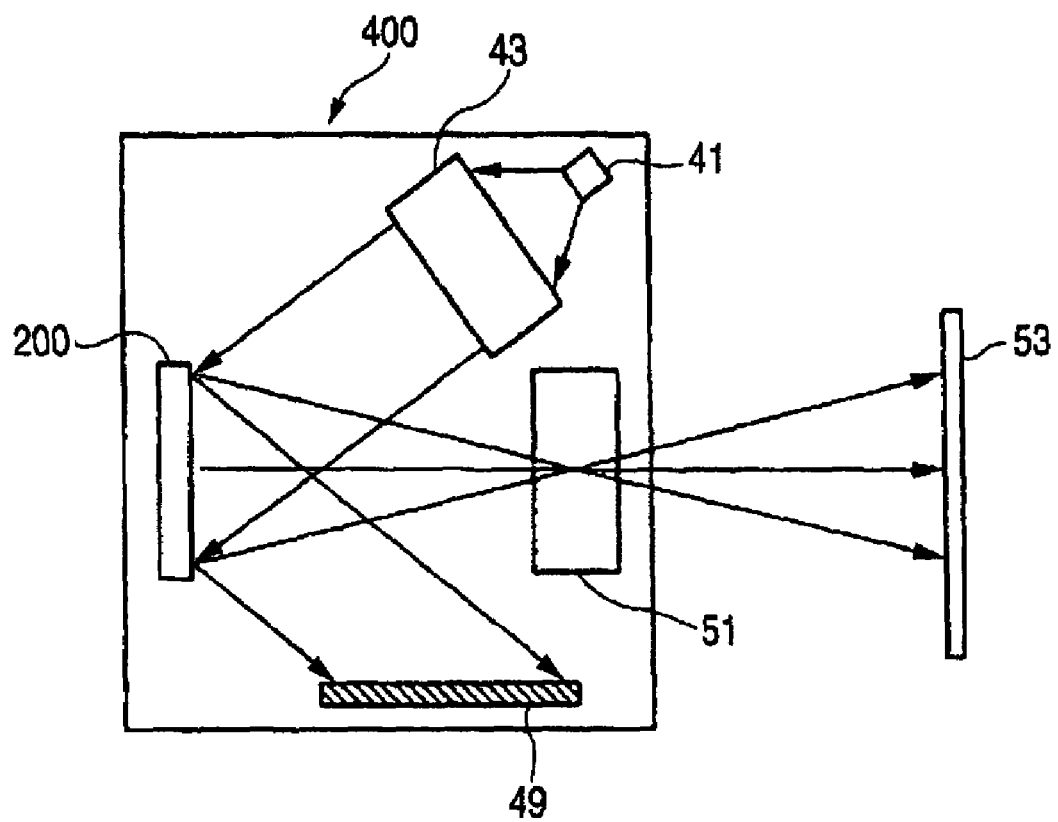
FIG. 19 is a view showing the schematic configuration of a projection apparatus, which includes the micro-electro mechanical modulation device array according to the embodiment of the invention.
Figure 20:
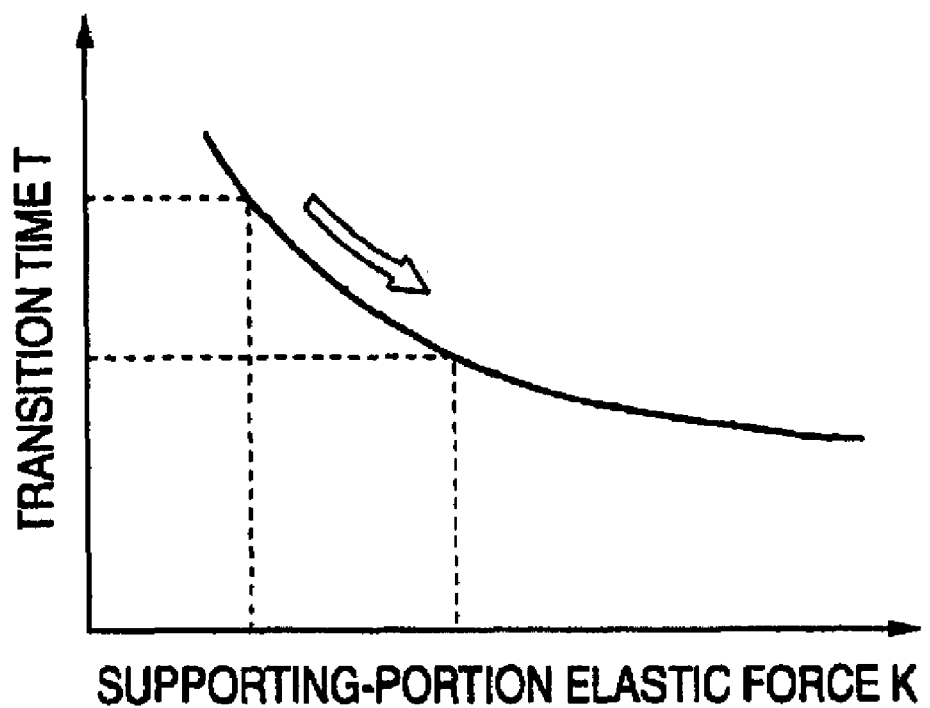
FIG. 20 is an explanatory view showing a relation between a transition time and an elastic force of an elastic supporting portion in designing a micro electric device according to the related art.

FIG. 19 is a view showing the schematic configuration of a projection apparatus which is configured using the micro-electro mechanical modulation device array of the invention. The same components as those of FIG. 18 will be denoted by the same reference numerals, and the description thereof will be omitted.

A projector 400 as the projection apparatus includes the illumination light source 41, the illumination optical system 43, the micro-electro mechanical modulation device array 200, and a projection optical system 51. The projection optical system 51 is an optical system for a projection apparatus for projecting light onto a screen 53 that is an image formation surface. The illumination optical system 43 may be the above-described collimator lens or microlens array.

Next, the operation of the projector 400 will be described.

The light emitted from the illumination light source 41 is condensed on a region whose area is smaller than one device of the micro-electro mechanical modulation devices 100 by the microlens array, for example, and enters the micro-electro mechanical modulation device array 200. The reflection of the light which enters each micro-electro mechanical modulation device 100 of the micro-electro mechanical modulation device array 200 is controlled in response to an image signal. The light reflected from the micro-electro mechanical modulation device array 200 is projected onto an image formation surface of the screen 53 by the projection optical system 51. In this way, the micro-electro mechanical modulation device array 200 can also be utilized for the projection apparatus, and can also be applied to a display device.

Therefore, in an image forming apparatus, such as the exposure apparatus 300 or the projector 400, the above micro-electro mechanical modulation device array 200 is provided as a constitutional principal part, thereby allowing low-voltage and high-speed displacement of the movable portion 15. Accordingly, high-speed exposure of a photosensitive material and display of a projector having a higher number of pixels are allowed. Further, in an image forming apparatus (exposure apparatus 300) whose gradation is controlled by ON/OFF of exposure light, it becomes possible to shorten an ON/OFF period Thereby, higher gradation can be realized. As a result, high-speed exposure of a photosensitive material and display of a projector having a higher number of pixels are allowed.

What is claimed is:

1. A micro-electro mechanical device comprising:
a movable portion;
an elastic supporting portion that supports the movable portion so that the movable portion is elastically deformable;
a plurality of driving portions that apply physical action forces in different directions to the movable portion, so as to rotationally displace the movable portion in first and second directions, wherein:
a transition time is a time from a state where the movable portion has been rotationally displaced in the first direction and stopped to a state where the driving portions apply the physical action forces to the movable portion to rotationally displace the movable portion in the second direction, which is different from the first direction, and the movable portion reaches a final displacement position,
an elastic force value of the elastic supporting portion and the transition time have such a relationship that when the elastic force value of the elastic supporting portion is equal to a certain value, the transition time takes a local maximum value, and
the elastic force value of the elastic supporting portion is equal to or less than the certain value at which the transition time takes the local maximum value.

2. The device according to claim 1, wherein:
the relationship between the elastic force value of the elastic supporting portion and the transition time is obtained under a condition where a potential difference between the movable portion and an electrode of one of the driving portions is equal to 10 volts, and the elastic force value of the elastic supporting portion is larger than 0 Nm and is equal to or less than the certain value at which the transition time takes the local maximum value.

3. The device according to claim 1, further comprising:
a stop member disposed at the final displacement position, wherein:
the movable portion is stopped by being in contact with the stop member.

4. The device according to claim 1, wherein the driving portions apply the physical action forces to a plurality of points of action of the movable portion.

5. The device according to claim 1, wherein the physical action forces that the driving portions apply to the movable portion so as to displace the movable portion in the first and second directions are electrostatic forces.

6. The device according to claim 1, wherein a planar shape of the movable portion is a quadrangular shape.

7. The device according to claim 1, wherein a waveform of each physical action force, which rotationally displaces the movable portion, includes at least one of a rectangular wave, a sine wave, a cosine wave, a sawtooth wave and a triangular wave.

8. The device according to claim 1, wherein the elastic supporting portion, which supports the movable portion so that the movable portion is elastically displaceable, is made of a polymeric material.

9. The device according to claim 1, wherein the elastic supporting portion, which supports the movable portion so that the movable portion is elastically displaceable, includes one selected from the group consisting of a metallic material, a resin material and a hybrid material of the metallic material and the resin material.

10. The device according to claim 1, further comprising:
a control unit that drives the driving portion to control the rotational displacement of the movable portion.

11. A micro-electro mechanical device array comprising:
a plurality of the micro-electro mechanical devices according to claim 1, wherein the micro-electro mechanical devices are arrayed one-dimensionally or two-dimensionally.

12. The array according to claim 11, wherein:
each of the micro-electro mechanical devices comprises a driving circuit including a memory circuit,
one of (i) electrodes provided in the movable portion and (ii) at least two or more fixed parts, which faces the movable portion, is a signal electrode into which a device displacement signal from the driving circuit is input, and
the other is a common electrode.

13. A light modulation device comprising:
a micro-electro mechanical device according to claim 1 wherein:
the micro-electro mechanical device rotationally displaces the movable portion to modulate light that has entered the micro-electro mechanical device.

14. A micro-electro mechanical light modulation device array comprising:
a plurality of the light modulation devices according to claim 13, wherein the light modulation devices are arrayed one-dimensionally or two-dimensionally.

15. The array according to claim 14, wherein:
each of the light modulation devices comprises a driving circuit including a memory circuit,
one of (i) electrodes provided in the movable portion and (ii) at least two or more fixed parts, which faces the movable portion, is a signal electrode into which a device displacement signal from the driving circuit is input, and the other is a common electrode.

16. An image forming apparatus comprising:

a light source;

the light modulation device according to claim 13 or the micro-electro mechanical light modulation device array according to claim 14;

an illumination optical system that irradiates the light modulation device or the micro-electro mechanical light modulation device array with light from the light source; and a projection optical system that projects the light emitted from the light modulation device or the micro-electro mechanical light modulation device array onto an image formation surface.

* * * * *